(12) United States Patent
Komatsubara et al.

(10) Patent No.: US 9,253,370 B2
(45) Date of Patent: Feb. 2, 2016

(54) NORMALIZATION METHOD FOR A VALUE OF AN EQUIVALENT LIGHTNESS AND A VALUE OF A DEGREE OF VIVIDNESS OF AN ARBITRARY COLOR, TONE TYPE IDENTIFICATION METHOD, MUNSELL VALUE CALCULATING METHOD, IMAGE FORMATION METHOD AND INTERFACE SCREEN DISPLAY DEVICE

(75) Inventors: Hitoshi Komatsubara, Saitama (JP); Shinji Kobayashi, Saitama (JP); Koichi Nakagawa, Chuo-ku (JP)

(73) Assignees: JAPAN COLOR RESEARCH INSTITUTE, Saitama (JP); NAKAGAWA CHEMICAL, INC., Tokyo (JP)

( * ) Notice: Subject to any disclaimer, the term of this patent is extended or adjusted under 35 U.S.C. 154(b) by 0 days.

(21) Appl. No.: 14/410,794

(22) PCT Filed: Jun. 26, 2012

(86) PCT No.: PCT/JP2012/004130
§ 371 (c)(1),
(2), (4) Date: Dec. 23, 2014

(87) PCT Pub. No.: WO2014/002135
PCT Pub. Date: Jan. 3, 2014

(65) Prior Publication Data
US 2015/0124273 A1 May 7, 2015

(51) Int. Cl.
*G06F 3/12* (2006.01)
*H04N 1/56* (2006.01)
*G01J 3/52* (2006.01)
*G01J 3/46* (2006.01)

(52) U.S. Cl.
CPC . *H04N 1/56* (2013.01); *G01J 3/462* (2013.01); *G01J 3/463* (2013.01); *G01J 3/465* (2013.01); *G01J 3/52* (2013.01); *H04N 2201/0082* (2013.01); *H04N 2201/0089* (2013.01)

(58) Field of Classification Search
CPC ....... G06T 7/408; G06T 75/40; G06T 1/6066; H04N 1/56; H04N 2201/0082; H04N 2201/0089; G01J 3/463; G01J 3/465; G01J 3/462; G01J 3/52
USPC ........ 358/1.1–3.29, 1.11–1.18; 356/402, 405, 356/406
See application file for complete search history.

(56) References Cited

U.S. PATENT DOCUMENTS 4,620,792 A * 11/1986 Suga .............................. 356/402
2005/0036668 A1 * 2/2005 McLennan et al. ........... 382/128

(Continued)

OTHER PUBLICATIONS

International Search Report (ISR) issued Sep. 18, 2012 in International (PCT) Application No. PCT/JP2012/004130.

(Continued)

*Primary Examiner* — Marcellus Augustin
(74) *Attorney, Agent, or Firm* — Wenderoth, Lind & Ponack, L.L.P.

(57) ABSTRACT

[Problem] To provide a technique for calculating the psychophysical value of a color corresponding to an arbitrarily defined tone by modeling a tone concept defined in the PCCS (Practical Color Co-ordinate System).
[Solution] A method for, regarding multiple types of tones defined in the PCCS, generating a definitional equation for each saturation to which each of the tones belongs, wherein a computer acquires the Munsell values of colors belonging to respective multiple tones belonging to the same saturation among the multiple types of tones defined in the PCCS, the computer stores the acquired multiple Munsell values in a predetermined storage device, the computer converts each of the multiple Munsell values stored in the storage device into a value in a predetermined color space composed of two axes of values representing lightness and values representing vividness, and the computer performs a predetermined regression calculation on a point group projected to the predetermined color space to find a regression equation passing through the origin of the predetermined color space.

14 Claims, 36 Drawing Sheets

REGRESSION EQUATIONS FOR HUE 2 AND COEFFICIENT k1 = 0.10

(56) References Cited

U.S. PATENT DOCUMENTS

2008/0247788 A1* 10/2008 Ayaki et al. .................. 399/321
2013/0044919 A1* 2/2013 Purcell et al. ................. 382/110
2014/0198234 A1* 7/2014 Kobayashi et al. ...... 348/231.99

OTHER PUBLICATIONS

Mitsuo Kobayashi et al., "Mathematical Relation among PCCS Tones, PCCS Color Attributes and Muncell Color Attributes", Journal of the Color Science Association of Japan, [ISSN: 0389-9357], vol. 25, No. 4, pp. 249-261, Dec. 1, 2001.

Yoshinobu Nayatani et al., "Relationships among Chromatic Tone, Perceived Lightness, and Degree of Vividness", Color Research and Application, vol. 30, No. 3, pp. 221-234, May 7, 2005.

Yasuyuki Kuge, "Munsell-kei kara PCCS Hue Tone-kei eno Hyoshokuchi Henkan no Hoho", Journal of the Japan Society of Colour Material, vol. 63, No. 9, pp. 513-516, Sep. 20, 1990.

Yoshinobu Nayatani et al., "Predictions of Munsell Values with the Same Perceived Lightness at Any Specified Chroma Irrespective of Hues-Determination of Any Tonal Colors", Color Research and Application, vol. 36, No. 2, pp. 140-147, Apr. 13, 2010.

Y. Nayatani, "Proposal of an opponent-colors system based on color-appearance and color-vision studies", Color Research and Application, vol. 29, No. 2, pp. 135-150, Jan. 29, 2004.

Translation of International Preliminary Report on Patentability (IPROP) issued Jan. 8, 2015 in International (PCT) Application No. PCT/JP2012/004130.

Komatsubara Hitoshi, "Conceptual of PCCS in a Perceived Color Appearance Space", together with English translation thereof.

* cited by examiner

FIG.3

COLOR INTENSITY VALUES CS(k1k2) OF VARIOUS HUES

| HUE | $k_1k_2$ | $CS(k_1k_2)$ | $C(H; Max)$ | MUNSELL HUE |
|---|---|---|---|---|
| Y100 | 0.542 | 1.000 | 20 | 5Y |
| Y75 · R25 | 0.582 | 1.074 | 21 | 10YR |
| Y50 · R50 | 0.651 | 1.201 | 24 | 5YR |
| Y25 · R75 | 0.742 | 1.369 | 27 | 10R |
| R100 | 0.824 | 1.520 | 30 | 5R |
| R75 · B25 | 0.925 | 1.707 | 34 | 5RP |
| R50 · B50 | 0.976 | 1.800 | 36 | 5P |
| R25 · B75 | 0.979 | 1.806 | 36 | 5PB |
| B100 | 0.876 | 1.616 | 32 | 5B |
| B75 · G25 | 0.801 | 1.478 | 30 | 10BG |
| B50 · G50 | 0.750 | 1.384 | 28 | 5BG |
| B25 · G75 | 0.718 | 1.325 | 27 | 10G |
| G100 | 0.695 | 1.282 | 26 | 5G |
| G75 · Y25 | 0.633 | 1.168 | 23 | 10GY |
| G50 · Y50 | 0.556 | 1.026 | 21 | 5GY |
| G25 · Y75 | 0.533 | 0.983 | 20 | 10Y |

FIG.4

COLOR INTENSITY VALUES CS(q) OF VARIOUS HUES

| HUE | q(H) | $V(H) \cdot w = bk$ $= 0 \cdot /C = 10$ | CS(q) |
|---|---|---|---|
| Y100 | 0.218 | 7.82 | 1.00 |
| Y75 · R25 | 0.135 | 6.99 | 1.12 |
| Y50 · R50 | 0.037 | 6.01 | 1.30 |
| Y25 · R75 | −0.035 | 5.29 | 1.48 |
| R100 | −0.086 | 4.78 | 1.64 |
| R75 · B25 | −0.140 | 4.24 | 1.84 |
| R50 · B50 | −0.157 | 4.07 | 1.92 |
| R25 · B75 | −0.126 | 4.38 | 1.79 |
| B100 | −0.084 | 4.80 | 1.63 |
| B75 · G25 | −0.042 | 5.22 | 1.50 |
| B50 · G50 | −0.018 | 5.46 | 1.43 |
| B25 · G75 | −0.008 | 5.56 | 1.41 |
| G100 | 0.002 | 5.66 | 1.38 |
| G75 · Y25 | 0.061 | 6.25 | 1.25 |
| G50 · Y50 | 0.145 | 7.19 | 1.09 |
| G25 · Y75 | 0.200 | 7.64 | 1.02 |

FIG.5

| q(H) OF VARIOUS HUES | |
| --- | --- |
| MUNSELL HUE | q(H) |
| 5Y | 0.218 |
| 10YR | 0.135 |
| 5YR | 0.037 |
| 10R | −0.035 |
| 5R | −0.086 |
| 5RP | −0.14 |
| 5P | −0.157 |
| 5PB | −0.126 |
| 5B | −0.084 |
| 10BG | −0.042 |
| 5BG | −0.018 |
| 10G | −0.008 |
| 5G | 0.002 |
| 10GY | 0.061 |
| 5GY | 0.145 |
| 10Y | 0.2 |

FIG.10

COMPARISON OF CORRELATION COEFFICIENTS $R^2$ OF LINEAR REGRESSION LINES (WHEN HUE NUMBER IS 2)

| TONE GROUP | IF CONDITIONED TO PASS THROUGH ORIGIN POINT | | | | IF NOT CONDITIONED TO PASS THROUGH ORIGIN POINT | | | |
|---|---|---|---|---|---|---|---|---|
| | COEFFICIENT K1 | | | | COEFFICIENT K1 | | | |
| | 0.1 | 0.15 | 0.2 | | 0.1 | 0.15 | 0.2 | |
| p,ltg,g,dkg | 0.9158 | 0.9934 | 0.9652 | | 0.9799 | 0.9942 | 0.9986 | |
| lt,sf,d,dk | 0.8994 | 0.9974 | 0.9514 | | 0.9959 | 0.9987 | 0.9996 | |
| b,s,dp | 0.9939 | 0.9958 | 0.8903 | | 0.9939 | 0.9976 | 0.9989 | |

FIG.14

| TONE GROUP | IF CONDITIONED TO PASS THROUGH ORIGIN POINT COEFFICIENT K1 | | | IF NOT CONDITIONED TO PASS THROUGH ORIGIN POINT COEFFICIENT K1 | | |
|---|---|---|---|---|---|---|
| | 0.1 | 0.15 | 0.2 | 0.1 | 0.15 | 0.2 |
| p,lt,g,dkg | 0.9123 | 0.9935 | 0.9652 | 0.9803 | 0.9945 | 0.9988 |
| lt,sf,d,dk | 0.893 | 0.9967 | 0.9451 | 0.994 | 0.9982 | 0.9994 |
| b,s,dp | 0.9172 | 0.9963 | 0.8754 | 0.9934 | 0.9975 | 0.999 |

FIG.18

| MUNSELL HUE | | TONE | | | | | | | | | | | |
|---|---|---|---|---|---|---|---|---|---|---|---|---|---|
| HUE NUMBER | p | ltg | g | dkg | lt | sf | D | Dk | b | s | dp | v |
| 2 | 4R | 4R | 4R | 4R | 4R | 4R | 4R | 4R | 4R | 4R | 4R | 4R |
| 4 | 10R | 10R | 10R | 10R | 10R | 10R | 10R | 10R | 10R | 10R | 10R | 10R |
| 6 | 8YR | 8YR | 8YR | 8YR | 8YR | 8YR | 8YR | 8YR | 8YR | 8YR | 8YR | 8YR |
| 8 | 5Y | 5Y | 5Y | 5Y | 5Y | 5Y | 5Y | 5Y | 5Y | 5Y | 5Y | 5Y |
| 10 | 3GY | 3GY | 3GY | 3GY | 3GY | 3GY | 3GY | 3GY | 3GY | 3GY | 3GY | 3GY |
| 12 | 3G | 3G | 3G | 3G | 3G | 3G | 3G | 3G | 3G | 3G | 3G | 3G |
| 14 | 5BG | 5BG | 5BG | 5BG | 5BG | 5BG | 5BG | 5BG | 5BG | 5BG | 5BG | 5BG |
| 16 | 5B | 5B | 5B | 5B | 5B | 5B | 5B | 5B | 5B | 5B | 5B | 5B |
| 18 | 3PB | 3PB | 3PB | 3PB | 3PB | 3PB | 3PB | 3PB | 3PB | 3PB | 3PB | 3PB |
| 20 | 9PB | 9PB | 9PB | 9PB | 9PB | 9PB | 9PB | 9PB | 9PB | 9PB | 9PB | 9PB |
| 22 | 7P | 7P | 7P | 7P | 7P | 7P | 7P | 7P | 7P | 7P | 7P | 7P |
| 24 | 6RP | 6RP | 6RP | 6RP | 6RP | 6RP | 6RP | 6RP | 6RP | 6RP | 6RP | 6RP |

FIG.19

| MUNSELL LIGHTNESS V HUE NUMBER | TONE | | | | | | | | | | | |
|---|---|---|---|---|---|---|---|---|---|---|---|---|
| | p | ltg | g | dkg | lt | sf | D | Dk | b | s | dp | v |
| 2 | 8.5 | 7 | 4 | 2 | 7.5 | 6 | 4.5 | 2.5 | 6 | 4.5 | 3.5 | 4.5 |
| 4 | 8.5 | 7 | 4 | 2 | 8 | 6.5 | 5 | 3 | 6.5 | 5 | 4 | 5.5 |
| 6 | 9 | 7.5 | 4.5 | 2.5 | 8.5 | 7 | 5.5 | 3.5 | 7.5 | 6.5 | 5 | 7 |
| 8 | 9 | 7.5 | 4.5 | 2.5 | 9 | 7.5 | 6 | 4 | 8.5 | 7.5 | 6 | 8 |
| 10 | 9 | 7.5 | 4.5 | 2.5 | 8.5 | 7 | 5.5 | 3.5 | 7.5 | 6.5 | 5 | 7 |
| 12 | 8.5 | 7 | 4 | 2 | 8 | 6.5 | 5 | 3 | 6.5 | 5 | 4 | 5.5 |
| 14 | 8.5 | 7 | 4 | 2 | 7.5 | 6 | 4.5 | 2.5 | 6 | 4.5 | 3.5 | 4.5 |
| 16 | 8.5 | 7 | 4 | 2 | 7 | 5.5 | 4 | 2.5 | 5.5 | 4 | 3 | 4 |
| 18 | 8 | 6.5 | 3.5 | 1.5 | 6.5 | 5 | 3.5 | 2 | 5 | 3.5 | 2.5 | 3.5 |
| 20 | 8 | 6.5 | 3.5 | 1.5 | 6.5 | 5 | 3.5 | 2 | 5 | 3.5 | 2.5 | 3.5 |
| 22 | 8 | 6.5 | 3.5 | 1.5 | 6.5 | 5 | 3.5 | 2 | 5 | 3.5 | 2.5 | 3.5 |
| 24 | 8.5 | 7 | 4 | 2 | 7 | 5.5 | 4 | 2.5 | 5.5 | 4 | 3 | 4 |

FIG.20

| MUNSELL CHROMA C HUE NUMBER | TONE | | | | | | | | | | | | |
|---|---|---|---|---|---|---|---|---|---|---|---|---|---|
| | p | ltg | g | dkg | lt | sf | D | Dk | b | s | dp | v |
| 2 | 2 | 2 | 2 | 2 | 1.5 | 6.5 | 6.5 | 6.5 | 6 | 12 | 12 | 11.5 | 14 |
| 4 | 4 | 2 | 2 | 2 | 1.5 | 6.5 | 6.5 | 6.5 | 6 | 11.5 | 11.5 | 11 | 14 |
| 6 | 6 | 2 | 2 | 2 | 1.5 | 6.5 | 6.5 | 6.5 | 6 | 11.5 | 11.5 | 11 | 13.5 |
| 8 | 8 | 2 | 2 | 2 | 1.5 | 6 | 6 | 6 | 5.5 | 11 | 11 | 10.5 | 13 |
| 10 | 10 | 2 | 2 | 2 | 1.5 | 5.5 | 5.5 | 5.5 | 5 | 10 | 10 | 9.5 | 12 |
| 12 | 12 | 2 | 2 | 2 | 1.5 | 5 | 5 | 5 | 4.5 | 9 | 9 | 8.5 | 11 |
| 14 | 14 | 2 | 2 | 2 | 1.5 | 5 | 5 | 5 | 4.5 | 8.5 | 8.5 | 8 | 10 |
| 16 | 16 | 2 | 2 | 2 | 1.5 | 5 | 5 | 5 | 4.5 | 8.5 | 8.5 | 8 | 10 |
| 18 | 18 | 2 | 2 | 2 | 1.5 | 5.5 | 5.5 | 5.5 | 5 | 10 | 10 | 9.5 | 11.5 |
| 20 | 20 | 2 | 2 | 2 | 1.5 | 5.5 | 5.5 | 5.5 | 5 | 10 | 10 | 9.5 | 11.5 |
| 22 | 22 | 2 | 2 | 2 | 1.5 | 5.5 | 5.5 | 5.5 | 5 | 10 | 10 | 9.5 | 11.5 |
| 24 | 24 | 2 | 2 | 2 | 1.5 | 6 | 6 | 6 | 5.5 | 10.5 | 10.5 | 10 | 12.5 |

FIG.21

| W-Bk HUE NUMBER | TONE | | | | | | | | | | | | |
|---|---|---|---|---|---|---|---|---|---|---|---|---|---|
| | p | ltg | g | dkg | lt | sf | d | dk | b | s | dp | v |
| 2 | 3.2 | 1.7 | -1.3 | -3.4 | 2.6 | 1.1 | -0.4 | -2.4 | 1.7 | 0.2 | -0.9 | 0.3 |
| 4 | 3.1 | 1.6 | -1.4 | -3.4 | 2.7 | 1.2 | -0.3 | -2.3 | 1.4 | -0.1 | -1.1 | 0.5 |
| 6 | 3.3 | 1.8 | -1.2 | -3.1 | 2.4 | 0.9 | -0.6 | -2.5 | 1 | 0 | -1.5 | 0.3 |
| 8 | 3.1 | 1.6 | -1.4 | -3.3 | 2.2 | 0.7 | -0.8 | -2.7 | 0.6 | -0.4 | -1.8 | -0.3 |
| 10 | 3.1 | 1.6 | -1.4 | -3.3 | 2 | 0.5 | -1 | -2.9 | 0.2 | -0.8 | -2.2 | -0.6 |
| 12 | 3 | 1.5 | -1.5 | -3.5 | 2.4 | 0.9 | -0.6 | -2.6 | 0.8 | -0.7 | -1.7 | -0.2 |
| 14 | 3 | 1.5 | -1.5 | -3.5 | 2.1 | 0.6 | -0.9 | -2.9 | 0.7 | -0.8 | -1.9 | -0.8 |
| 16 | 3.2 | 1.7 | -1.3 | -3.4 | 1.9 | 0.4 | -1.1 | -2.6 | 0.7 | -0.8 | -1.8 | -0.7 |
| 18 | 2.7 | 1.2 | -1.8 | -3.8 | 1.7 | 0.2 | -1.3 | -2.9 | 0.7 | -0.8 | -1.9 | -0.6 |
| 20 | 2.8 | 1.3 | -1.7 | -3.8 | 1.8 | 0.3 | -1.2 | -2.8 | 0.9 | -0.6 | -1.6 | -0.4 |
| 22 | 2.8 | 1.3 | -1.7 | -3.8 | 1.9 | 0.4 | -1.1 | -2.7 | 1.1 | -0.4 | -1.5 | -0.2 |
| 24 | 3.3 | 1.8 | -1.2 | -3.3 | 2.3 | 0.8 | -0.7 | -2.3 | 1.4 | -0.1 | -1.1 | 0.2 |
| AVERAGE | 3 | 1.5 | -1.5 | -3.5 | 2.2 | 0.7 | -0.8 | -2.6 | 0.9 | -0.4 | -1.6 | -0.2 |
| STANDARD DEVIATION | 0.19 | 0.19 | 0.19 | 0.22 | 0.34 | 0.34 | 0.34 | 0.23 | 0.41 | 0.35 | 0.37 | 0.45 |

FIG.22

| Veg | | | | | | TONE | | | | | | | | | |
|---|---|---|---|---|---|---|---|---|---|---|---|---|---|---|---|
| HUE NUMBER | p | ltg | g | dkg | lt | sf | D | Dk | b | s | dp | v |
| 2 | 8.8 | 7.3 | 4.3 | 2.3 | 8.6 | 7.1 | 5.6 | 3.5 | 8 | 6.5 | 5.5 | 6.9 |
| 4 | 8.7 | 7.2 | 4.2 | 2.2 | 8.8 | 7.3 | 5.8 | 3.7 | 7.9 | 6.4 | 5.3 | 7.2 |
| 6 | 9 | 7.5 | 4.5 | 2.5 | 8.6 | 7.1 | 5.6 | 3.6 | 7.6 | 6.6 | 5.1 | 7.1 |
| 8 | 8.8 | 7.3 | 4.3 | 2.3 | 8.4 | 6.9 | 5.4 | 3.4 | 7.4 | 6.4 | 4.9 | 6.7 |
| 10 | 8.9 | 7.4 | 4.4 | 2.4 | 8.1 | 6.6 | 5.1 | 3.2 | 6.8 | 5.8 | 4.4 | 6.2 |
| 12 | 8.6 | 7.1 | 4.1 | 2.1 | 8.4 | 6.9 | 5.4 | 3.3 | 7.1 | 5.6 | 4.6 | 6.3 |
| 14 | 8.7 | 7.2 | 4.2 | 2.2 | 8 | 6.5 | 5 | 3 | 6.9 | 5.4 | 4.3 | 5.5 |
| 16 | 8.8 | 7.3 | 4.3 | 2.2 | 7.8 | 6.3 | 4.8 | 3.2 | 6.9 | 5.4 | 4.3 | 5.6 |
| 18 | 8.4 | 6.9 | 3.9 | 1.8 | 7.5 | 6 | 4.5 | 3 | 6.9 | 5.4 | 4.3 | 5.7 |
| 20 | 8.4 | 6.9 | 3.9 | 1.8 | 7.7 | 6.2 | 4.7 | 3.1 | 7.1 | 5.6 | 4.5 | 5.9 |
| 22 | 8.4 | 6.9 | 3.9 | 1.8 | 7.7 | 6.2 | 4.7 | 3.1 | 7.2 | 5.7 | 4.6 | 6.1 |
| 24 | 8.9 | 7.4 | 4.4 | 2.3 | 8.2 | 6.7 | 5.2 | 3.6 | 7.6 | 6.1 | 5 | 6.6 |
| AVERAGE | 8.7 | 7.2 | 4.2 | 2.2 | 8.1 | 6.6 | 5.1 | 3.3 | 7.3 | 5.9 | 4.7 | 6.3 |
| STANDARD DEVIATION | 0.21 | 0.21 | 0.21 | 0.24 | 0.4 | 0.4 | 0.4 | 0.26 | 0.42 | 0.47 | 0.41 | 0.57 |

FIG.23

| DV HUE NUMBER | TONE | | | | | | | | | | | | |
|---|---|---|---|---|---|---|---|---|---|---|---|---|---|
| | p | ltg | g | dkg | lt | sf | D | Dk | b | s | dp | v |
| 2 | 2.6 | 2.3 | 1.7 | 1 | 8.2 | 7.2 | 6.3 | 4.5 | 14 | 12.2 | 10.5 | 14.5 |
| 4 | 2.6 | 2.3 | 1.7 | 1 | 8.3 | 7.3 | 6.3 | 4.6 | 13.1 | 11.4 | 9.8 | 14.7 |
| 6 | 2.7 | 2.4 | 1.8 | 1 | 8.1 | 7.1 | 6.1 | 4.5 | 12.6 | 11.4 | 9.4 | 13.9 |
| 8 | 2.6 | 2.3 | 1.7 | 1 | 7.3 | 6.4 | 5.5 | 4 | 11.7 | 10.6 | 8.6 | 12.6 |
| 10 | 2.6 | 2.3 | 1.7 | 1 | 6.6 | 5.8 | 5 | 3.6 | 10.2 | 9.2 | 7.4 | 11.3 |
| 12 | 2.6 | 2.3 | 1.7 | 1 | 6.2 | 5.5 | 4.7 | 3.3 | 9.8 | 8.4 | 7.1 | 10.8 |
| 14 | 2.6 | 2.3 | 1.7 | 1 | 6 | 5.3 | 4.5 | 3.2 | 9.1 | 7.8 | 6.5 | 9.2 |
| 16 | 2.6 | 2.3 | 1.7 | 1 | 6 | 5.2 | 4.5 | 3.3 | 9.1 | 7.8 | 6.5 | 9.3 |
| 18 | 2.5 | 2.2 | 1.6 | 0.9 | 6.4 | 5.6 | 4.8 | 3.5 | 10.7 | 9.2 | 7.7 | 10.8 |
| 20 | 2.6 | 2.3 | 1.7 | 0.9 | 6.5 | 5.7 | 4.8 | 3.6 | 10.9 | 9.4 | 7.9 | 11.1 |
| 22 | 2.6 | 2.3 | 1.7 | 0.9 | 6.5 | 5.7 | 4.9 | 3.6 | 11.1 | 9.6 | 8.1 | 11.3 |
| 24 | 2.7 | 2.4 | 1.8 | 1 | 7.4 | 6.5 | 5.6 | 4.3 | 12 | 10.4 | 8.9 | 12.7 |
| AVERAGE | 2.6 | 2.3 | 1.7 | 1 | 7 | 6.1 | 5.2 | 3.8 | 11.2 | 9.8 | 8.2 | 11.8 |
| STANDARD DEVIATION | 0.04 | 0.04 | 0.04 | 0.03 | 0.86 | 0.77 | 0.69 | 0.52 | 1.56 | 1.44 | 1.26 | 1.85 |

FIG.24

| DV' HUE NUMBER | TONE | | | | | | | | | | | | |
|---|---|---|---|---|---|---|---|---|---|---|---|---|---|
| | p | ltg | g | dkg | lt | sf | D | Dk | b | s | dp | v |
| 2 | 3 | 2.5 | 1.6 | 0.7 | 9.1 | 7.6 | 6.1 | 3.8 | 15 | 12.3 | 10 | 14.7 |
| 4 | 2.9 | 2.5 | 1.6 | 0.7 | 9.2 | 7.7 | 6.2 | 3.9 | 13.9 | 11.3 | 9.2 | 15 |
| 6 | 3 | 2.5 | 1.6 | 0.8 | 8.8 | 7.4 | 5.9 | 3.7 | 13.1 | 11.4 | 8.5 | 14.1 |
| 8 | 2.9 | 2.5 | 1.6 | 0.8 | 8 | 6.6 | 5.3 | 3.3 | 12 | 10.3 | 7.7 | 12.3 |
| 10 | 2.9 | 2.5 | 1.6 | 0.8 | 7.2 | 5.9 | 4.7 | 2.8 | 10.3 | 8.8 | 6.4 | 10.9 |
| 12 | 2.9 | 2.4 | 1.5 | 0.7 | 6.8 | 5.7 | 4.6 | 2.8 | 10.1 | 8.1 | 6.4 | 10.7 |
| 14 | 2.9 | 2.5 | 1.6 | 0.7 | 6.6 | 5.4 | 4.3 | 2.5 | 9.3 | 7.4 | 5.8 | 8.8 |
| 16 | 3 | 2.5 | 1.6 | 0.7 | 6.4 | 5.3 | 4.2 | 2.7 | 9.4 | 7.5 | 5.8 | 9 |
| 18 | 2.8 | 2.4 | 1.5 | 0.6 | 6.9 | 5.6 | 4.4 | 2.8 | 11 | 8.8 | 6.8 | 10.4 |
| 20 | 2.8 | 2.4 | 1.5 | 0.6 | 7 | 5.7 | 4.5 | 2.9 | 11.4 | 9.1 | 7.1 | 10.9 |
| 22 | 2.8 | 2.4 | 1.5 | 0.7 | 7 | 5.8 | 4.6 | 3 | 11.6 | 9.3 | 7.3 | 11.1 |
| 24 | 3 | 2.5 | 1.6 | 0.8 | 8.1 | 6.7 | 5.4 | 3.6 | 12.7 | 10.4 | 8.3 | 12.9 |
| AVERAGE | 2.9 | 2.5 | 1.6 | 0.7 | 7.6 | 6.3 | 5 | 3.2 | 11.7 | 9.6 | 7.4 | 11.7 |
| STANDARD DEVIATION | 0.06 | 0.06 | 0.06 | 0.05 | 1 | 0.87 | 0.75 | 0.49 | 1.78 | 1.58 | 1.33 | 2.09 |

FIG.25

| Veq* HUE NUMBER | TONE | | | | | | | | | | | |
|---|---|---|---|---|---|---|---|---|---|---|---|---|
| | p | ltg | g | dkg | lt | sf | D | Dk | b | s | dp | V |
| 2 | 8.5 | 6.2 | 3.6 | 2.1 | 8.1 | 5.8 | 4.6 | 3 | 7.3 | 5.2 | 4.4 | 5.5 |
| 4 | 8.2 | 5.6 | 3.4 | 2 | 8.3 | 5.7 | 4.5 | 3.1 | 6.7 | 4.9 | 4.2 | 5.5 |
| 6 | 8.7 | 6.2 | 3.6 | 2.2 | 7.9 | 5.5 | 4.4 | 3 | 6.3 | 5.1 | 4.1 | 5.5 |
| 8 | 8.5 | 6.4 | 3.7 | 2.2 | 7.9 | 5.8 | 4.5 | 3 | 6.5 | 5.3 | 4.2 | 5.5 |
| 10 | 8.7 | 6.9 | 3.9 | 2.3 | 7.8 | 6 | 4.6 | 2.9 | 6.3 | 5.2 | 3.9 | 5.5 |
| 12 | 8.4 | 6.6 | 3.7 | 2 | 8.1 | 6.2 | 4.7 | 3 | 6.6 | 5 | 4.1 | 5.5 |
| 14 | 8.7 | 7.2 | 4.2 | 2.1 | 8 | 6.5 | 5 | 3 | 6.9 | 5.3 | 4.3 | 5.5 |
| 16 | 8.8 | 7.3 | 4.3 | 2.2 | 7.8 | 6.2 | 4.7 | 3.2 | 6.8 | 5.3 | 4.2 | 5.5 |
| 18 | 8.3 | 6.8 | 3.8 | 1.8 | 7.5 | 5.9 | 4.4 | 2.9 | 6.8 | 5.2 | 4.2 | 5.5 |
| 20 | 8.3 | 6.6 | 3.7 | 1.8 | 7.4 | 5.8 | 4.4 | 2.9 | 6.8 | 5.2 | 4.2 | 5.5 |
| 22 | 8.3 | 6.5 | 3.6 | 1.8 | 7.4 | 5.7 | 4.3 | 2.9 | 6.9 | 5.2 | 4.2 | 5.5 |
| 24 | 8.7 | 6.7 | 3.8 | 2.1 | 7.8 | 5.7 | 4.4 | 3.2 | 7 | 5.2 | 4.3 | 5.5 |
| AVERAGE | 8.5 | 6.6 | 3.8 | 2 | 7.8 | 5.9 | 4.5 | 3 | 6.7 | 5.2 | 4.2 | 5.5 |
| STANDARD DEVIATION | 0.21 | 0.45 | 0.24 | 0.18 | 0.28 | 0.29 | 0.19 | 0.1 | 0.28 | 0.12 | 0.13 | 0 |

FIG.26

| DV* | TONE | | | | | | | | | | | | | |
|---|---|---|---|---|---|---|---|---|---|---|---|---|---|---|
| HUE NUMBER | p | ltg | g | dkg | lt | sf | D | Dk | b | s | dp | V | |
| 2 | 2 | 1.7 | 1.1 | 0.5 | 6.2 | 5.2 | 4.2 | 2.6 | 10.2 | 8.3 | 6.8 | 10 | |
| 4 | 1.9 | 1.6 | 1 | 0.5 | 6.1 | 5.1 | 4.1 | 2.6 | 9.3 | 7.5 | 6.1 | 10 | |
| 6 | 2.1 | 1.8 | 1.2 | 0.6 | 6.3 | 5.3 | 4.2 | 2.6 | 9.4 | 8.1 | 6.1 | 10 | |
| 8 | 2.4 | 2 | 1.3 | 0.6 | 6.5 | 5.4 | 4.3 | 2.7 | 9.7 | 8.4 | 6.2 | 10 | |
| 10 | 2.7 | 2.3 | 1.5 | 0.7 | 6.6 | 5.5 | 4.3 | 2.6 | 9.5 | 8.1 | 5.9 | 10 | |
| 12 | 2.7 | 2.3 | 1.4 | 0.7 | 6.4 | 5.3 | 4.3 | 2.6 | 9.5 | 7.6 | 6 | 10 | |
| 14 | 3.3 | 2.8 | 1.8 | 0.8 | 7.5 | 6.2 | 4.9 | 2.9 | 10.6 | 8.5 | 6.6 | 10 | |
| 16 | 3.3 | 2.8 | 1.8 | 0.8 | 7.2 | 5.9 | 4.7 | 3 | 10.4 | 8.3 | 6.4 | 10 | |
| 18 | 2.7 | 2.3 | 1.4 | 0.6 | 6.6 | 5.4 | 4.2 | 2.7 | 10.6 | 8.4 | 6.6 | 10 | |
| 20 | 2.6 | 2.2 | 1.4 | 0.6 | 6.4 | 5.3 | 4.1 | 2.7 | 10.5 | 8.4 | 6.6 | 10 | |
| 22 | 2.6 | 2.1 | 1.3 | 0.6 | 6.3 | 5.2 | 4.1 | 2.7 | 10.4 | 8.4 | 6.6 | 10 | |
| 24 | 2.3 | 2 | 1.3 | 0.6 | 6.3 | 5.2 | 4.2 | 2.8 | 9.9 | 8.1 | 6.4 | 10 | |
| AVERAGE | 2.6 | 2.2 | 1.4 | 0.6 | 6.5 | 5.4 | 4.3 | 2.7 | 10 | 8.2 | 6.4 | 10 | |
| STANDARD DEVIATION | 0.44 | 0.37 | 0.23 | 0.11 | 0.41 | 0.32 | 0.24 | 0.14 | 0.52 | 0.31 | 0.29 | 0 | |

FIG.27

DISTANCES OF REPRESENTATIVE COLORS OF HCC201 FROM BLACK, STANDARDIZED BY DISTANCE OF Vivid

| DISTANCE FROM BLACK | TONE | | | | | | | | | | | | | |
|---|---|---|---|---|---|---|---|---|---|---|---|---|---|---|
| HUE NUMBER | p | ltg | g | dkg | lt | sf | d | dk | b | s | dp | v |
| 2 | 0.57 | 0.48 | 0.28 | 0.15 | 0.77 | 0.64 | 0.51 | 0.32 | 1.05 | 0.86 | 0.7 | 1 |
| 4 | 0.55 | 0.46 | 0.27 | 0.14 | 0.76 | 0.64 | 0.51 | 0.33 | 0.96 | 0.78 | 0.64 | 1 |
| 6 | 0.6 | 0.5 | 0.31 | 0.17 | 0.78 | 0.65 | 0.51 | 0.32 | 0.96 | 0.84 | 0.63 | 1 |
| 8 | 0.66 | 0.55 | 0.33 | 0.17 | 0.83 | 0.68 | 0.54 | 0.33 | 1 | 0.86 | 0.65 | 1 |
| 10 | 0.75 | 0.62 | 0.37 | 0.2 | 0.87 | 0.71 | 0.55 | 0.34 | 0.99 | 0.85 | 0.62 | 1 |
| 12 | 0.74 | 0.61 | 0.36 | 0.18 | 0.87 | 0.72 | 0.57 | 0.35 | 1 | 0.8 | 0.64 | 1 |
| 14 | 0.89 | 0.73 | 0.43 | 0.22 | 1 | 0.82 | 0.64 | 0.38 | 1.12 | 0.88 | 0.7 | 1 |
| 16 | 0.87 | 0.73 | 0.43 | 0.22 | 0.95 | 0.78 | 0.6 | 0.4 | 1.1 | 0.87 | 0.68 | 1 |
| 18 | 0.74 | 0.61 | 0.35 | 0.18 | 0.86 | 0.7 | 0.53 | 0.35 | 1.1 | 0.87 | 0.68 | 1 |
| 20 | 0.71 | 0.59 | 0.34 | 0.16 | 0.84 | 0.68 | 0.52 | 0.34 | 1.08 | 0.87 | 0.68 | 1 |
| 22 | 0.7 | 0.58 | 0.33 | 0.15 | 0.82 | 0.67 | 0.52 | 0.34 | 1.08 | 0.86 | 0.69 | 1 |
| 24 | 0.65 | 0.54 | 0.33 | 0.17 | 0.8 | 0.66 | 0.52 | 0.36 | 1.03 | 0.84 | 0.67 | 1 |
| AVERAGE | 0.7 | 0.58 | 0.34 | 0.17 | 0.85 | 0.69 | 0.54 | 0.35 | 1.04 | 0.85 | 0.66 | |
| STANDARD DEVIATION | 0.11 | 0.09 | 0.05 | 0.03 | 0.07 | 0.06 | 0.04 | 0.02 | 0.05 | 0.03 | 0.03 | |

FIG.31

| MUNSELL HUE MH | q(H) | MUNSELL HUE MH | q(H) |
|---|---|---|---|
| 2.5 RP | −0.151 | 7.5 GY | 0.114 |
| 5.0 RP | −0.141 | 10.0 GY | 0.06 |
| 7.5 RP | −0.127 | 2.5 G | 0.024 |
| 10.0 RP | −0.113 | 5.0 G | 0.002 |
| 1.3 R | −0.11 | 7.5 G | −0.005 |
| 2.5 R | −0.108 | 10.0 G | −0.008 |
| 5.0 R | −0.086 | 2.5 BG | −0.014 |
| 6.3 R | −0.074 | 5.0 BG | −0.018 |
| 7.5 R | −0.062 | 7.5 BG | −0.031 |
| 10.0 R | −0.035 | 10.0 BG | −0.042 |
| 1.3 YR | −0.019 | 2.5 B | −0.059 |
| 2.5 YR | −0.002 | 5.0 B | −0.084 |
| 3.8 YR | 0.017 | 7.5 B | −0.096 |
| 5.0 YR | 0.037 | 10.0 B | −0.107 |
| 7.5 YR | 0.081 | 2.5 PB | −0.117 |
| 8.8 YR | 0.106 | 3.8 PB | −0.122 |
| 10.0 YR | 0.135 | 5.0 PB | −0.126 |
| 2.5 Y | 0.189 | 6.3 PB | −0.131 |
| 5.0 Y | 0.218 | 7.5 PB | −0.136 |
| 6.3 Y | 0.218 | 10.0 PB | −0.146 |
| 7.5 Y | 0.215 | 2.5 P | −0.152 |
| 10.0 Y | 0.201 | 5.0 P | −0.157 |
| 2.5 GY | 0.181 | 7.5 P | −0.156 |
| 5.0 GY | 0.155 | 10.0 P | −0.155 |

FIG.32

INPUT FOLLOWING INFORMATION TO DESIGNATE TONE TO CALCULATE CORRESPONDING MUNSELL VALUES.

■ DV* AND Veq* EXPRESSING TONE OF TARGET COLOR

DV* EXPRESSING TONE OF TARGET COLOR

Veq* EXPRESSING TONE OF TARGET COLOR

OR

DISTANCE FROM ORIGIN POINT EXPRESSING TONE OF TARGET COLOR

ANGLE EXPRESSING TONE OF TARGET COLOR

■ MUNSELL HUE MH OF TARGET COLOR

■ MUNSELL LIGHTNESS $MV_{vivid}$ OF VIVID COLOR OF COLOR MATERIAL ACTUALLY USED TO EXPRESS HUE OF TARGET COLOR ■ MUNSELL CHROMA $MC_{vivid}$ OF VIVID COLOR OF COLOR MATERIAL ACTUALLY USED TO EXPRESS HUE OF TARGET COLOR

↓ CALCULATE

MUNSELL HUE OF TARGET TONE [H]

MUNSELL LIGHTNESS OF TARGET TONE [V]

MUNSELL CHROMA OF TARGET TONE [C]

CANCEL     CALCULATE CORRESPONDING MUNSELL VALUES

NORMALIZATION METHOD FOR A VALUE OF AN EQUIVALENT LIGHTNESS AND A VALUE OF A DEGREE OF VIVIDNESS OF AN ARBITRARY COLOR, TONE TYPE IDENTIFICATION METHOD, MUNSELL VALUE CALCULATING METHOD, IMAGE FORMATION METHOD AND INTERFACE SCREEN DISPLAY DEVICE

TECHNICAL FIELD

The present invention relates to a modeling of the tone concept of color system having colors of a plurality of types of tones associated with a plurality of hues.

BACKGROUND ART

The PCCS (Practical Color Co-ordinate System) has heretofore been widely known as a color system for use in color design conscious of color harmony. FIG. 36 is a conceptual diagram for explaining the concept of the PCCS.

The PCCS defines a concept "tone" which can be said to be a composite concept of lightness and saturation, and expresses a basic series of color harmony by two series "hue" and "tone." In the PCCS, 12 types of tones or concepts expressing color tones are defined, including "soft (sf)," "pale (p)," and "strong (s)."

Colors belonging to the same tone series have common emotional effects (impressions) even in different hues.

As described above, "tone" is a concept of color perception having a certain perceptual regularity. However, its correlation with a psychophysical value which is a quantity obtained by evaluating the strength of a stimulus, a physical quantity, in terms of the strength of a sensed quantity is unknown. The psychophysical value of color belonging to an arbitrarily defined tone is therefore unable to be determined.

Creating a color chart of arbitrary intermediate tones and the like not defined on the PCCS (such as intermediate tones between "pale (p)" and "light (lt)") therefore needs to rely on trial and error based on human perception. Manual operations based on human perception can easily cause variations depending on the sense of the creator.

SUMMARY OF INVENTION

Technical Problem

Moreover, since the balance of arrangement of tones within the gamut of the color material used to express colors is important, colors are not psychophysically fixed but are affected by the size and shape of the gamut of the used color material.

For such reasons, the concept of "tone" in the PCCS has been unable to be rationally defined by a color space of psychophysical values or a color space compatible with psychophysical values.

The present invention has been achieved to solve the foregoing problems, and it is an object thereof to provide a technique for modeling the tone concept defined in the color system having colors of a plurality of types of tones associated with a plurality of hues.

Solution to Problem

To solve the foregoing problems, an aspect of the present invention relates to a normalization method for a value of an equivalent lightness and a value of a degree of vividness of an arbitrary color comprising: allowing a computer to obtain Munsell hue, Munsell lightness and Munsell chroma of the arbitrarily color; allowing the computer to convert the Munsell lightness into a value of an equivalent lightness indicating the lightness of color humanly perceived by using the Munsell hue and the Munsell chroma, and convert the Munsell chroma into a value of a degree of vividness indicating the vividness of color humanly perceived by using the Munsell hue and the Munsell lightness; allowing the computer to normalize the value of the degree of vividness of the arbitrary color by using a value of a degree of vividness of a vivid color of the Munsell hue; allowing the computer to normalize the value of the equivalent lightness of the arbitrary color by using a value of the equivalent lightness of the vivid color and a value of the equivalent lightness of white if the value of the equivalent lightness of the arbitrary color is equal to or greater than the value of the equivalent lightness of the vivid color; and allowing the computer to normalize the value of the equivalent lightness of the arbitrary color by using a value of the equivalent lightness of the vivid color and a value of the equivalent lightness of black if the value of the equivalent lightness of the arbitrary color is less than the value of the equivalent lightness of the vivid color.

Moreover, an aspect of the present invention relates to a tone type determination method comprising: allowing a computer to obtain Munsell hue, Munsell lightness and Munsell chroma of an arbitrarily color; allowing the computer to convert the Munsell lightness into a value of an equivalent lightness indicating the lightness of color humanly perceived by using the Munsell hue and the Munsell chroma, and convert the Munsell chroma into a value of a degree of vividness indicating the vividness of color humanly perceived by using the Munsell hue and the Munsell lightness; allowing the computer to normalize the value of the degree of vividness of the arbitrary color by using a value of a degree of vividness of a vivid color of the Munsell hue; allowing the computer to normalize the value of the equivalent lightness of the arbitrary color by using a value of the equivalent lightness of the vivid color and a value of the equivalent lightness of white if the value of the equivalent lightness of the arbitrary color is equal to or greater than the value of the equivalent lightness of the vivid color; allowing the computer to normalize the value of the equivalent lightness of the arbitrary color by using a value of the equivalent lightness of the vivid color and a value of the equivalent lightness of black if the value of the equivalent lightness of the arbitrary color is less than the value of the equivalent lightness of the vivid color; and allowing the computer to determine one of tone groups to which the arbitrary color belongs in a color system having colors of a plurality of types of tones associated with a plurality of hues on the basis of normalized values indicating the equivalent lightness and values indicating a degree of vividness of the colors of a plurality of types of tones in the color system, and the normalized value of the equivalent lightness and the value of the degree of vividness of the arbitrary color.

Moreover, an aspect of the present invention relates to a Munsell value calculating method comprising: allowing a computer to obtain a normalized value of equivalent lightness and a value of a degree of vividness corresponding to a tone of a target color and Munsell hue of the target color in a color perception space, the color perception space being constructed by converting Munsell lightness of a color into a value of an equivalent lightness indicating the lightness of color humanly perceived by using Munsell hue and Munsell chroma, converting the Munsell chroma of the color into a value of a degree of vividness indicating the vividness of color humanly perceived by using the Munsell hue and the Munsell lightness, and normalizing the value of the equivalent lightness and the value of the degree of vividness by using a value of equivalent lightness and a value of a degree of vividness of a vivid color in the Munsell hue; and allowing the computer to calculate Munsell lightness and Munsell chroma of the target color on the basis of the normalized value of equivalent lightness and the value of the degree of vividness corresponding to the tone of the target color and the normalized value of equivalent lightness and the value of the degree of vividness of the vivid color in the Munsell hue of the target color.

Moreover, an aspect of the present invention relates to an image formation method comprising: forming an image of the color designated by the Munsell value of the target color calculated in the Munsell value method on a sheet serving.

Moreover, an aspect of the present invention relates to an interface screen display device comprising:

an input screen display control unit that causes an input screen for requesting DV* and Veq* expressing a tone of target color, a Munsell hue MH of the target color, and a Munsell lightness MV_vivid and a Munsell chroma MC_vivid of Vivid color of a color material actually used to express a hue MH of the target color as input values to be displayed, the color perception space being constructed by converting Munsell lightness V of a color into an equivalent lightness Veq indicating the lightness of color humanly perceived by using Munsell hue H and Munsell chroma C of the color, converting the Munsell chroma C of the color into a degree of vividness DV indicating the vividness of color humanly perceived by using the Munsell hue H and the Munsell lightness V, and normalizing the equivalent lightness Veq and the degree of vividness DV by using a equivalent lightness MV_vivid and a degree of vividness MC_vivid of a vivid color in the Munsell hue H of the color; and a calculation result display control unit that causes the Munsell lightness MV and the Munsell chroma MC calculated corresponding to a tone of the target tone specified by the input values input by the input screen display control unit to be displayed.

Advantageous Effects of Invention

As described in detail above, according to the present invention, it is possible to provide a technique for modeling the tone concept defined in the color system having colors of a plurality of types of tones associated with a plurality of hues.

BRIEF DESCRIPTION OF DRAWINGS

FIG. 3 is a diagram showing a data table for determining the value of a hue dependence coefficient q(H).

FIG. 4 is a diagram showing a data table for determining the value of the hue dependence coefficient q(H).

FIG. 5 is a diagram showing a data table for obtaining the value of the hue dependence coefficient q(H) determined from the tables shown in FIGS. 3 and 4.

FIG. 10 is a table comparing the coefficients of correlation of regression equations determined for the respective examples shown in FIGS. 7 to 9.

FIG. 14 is a table comparing the coefficients of correlation of regression equations determined for the respective examples shown in FIGS. 11 to 13.

FIG. 18 is a table showing the Munsell hues of representative colors of respective tones on the HCC201.

FIG. 19 is a table showing the Munsell lightnesses of the representative colors of the respective tones on the HCC201.

FIG. 20 is a table showing the Munsell chromas of the representative colors of the respective tones on the HCC201.

FIG. 21 shows the values of [W−Bk] in respective hues calculated for respective tones by (Eq. 3).

FIG. 22 shows the values of Veq in respective hues calculated for respective tones by (Eq. 2).

FIG. 23 shows the values of DV in the respective hues calculated for respective tones by (Eq. 1).

FIG. 24 shows the values of DV' in the respective hues calculated for respective tones by (Eq. 5).

FIG. 25 shows the values of Veq* in the respective hues calculated for respective tones by (Eq. 7) or (Eq. 8).

FIG. 26 shows the values of DV* in the respective hues calculated for respective tones by (Eq. 6).

FIG. 27 is a table showing the distances of respective representative colors of the HCC201 from black, obtained from the data shown in FIG. 17 and standardized by the distance of Vivid.

FIG. 31 is a diagram showing q(H) values corresponding to Munsell hues.

FIG. 32 is a diagram showing an example of a user interface screen that an input screen display control unit 110 causes a display 805 to display.

DESCRIPTION OF EMBODIMENTS

Figure 1:
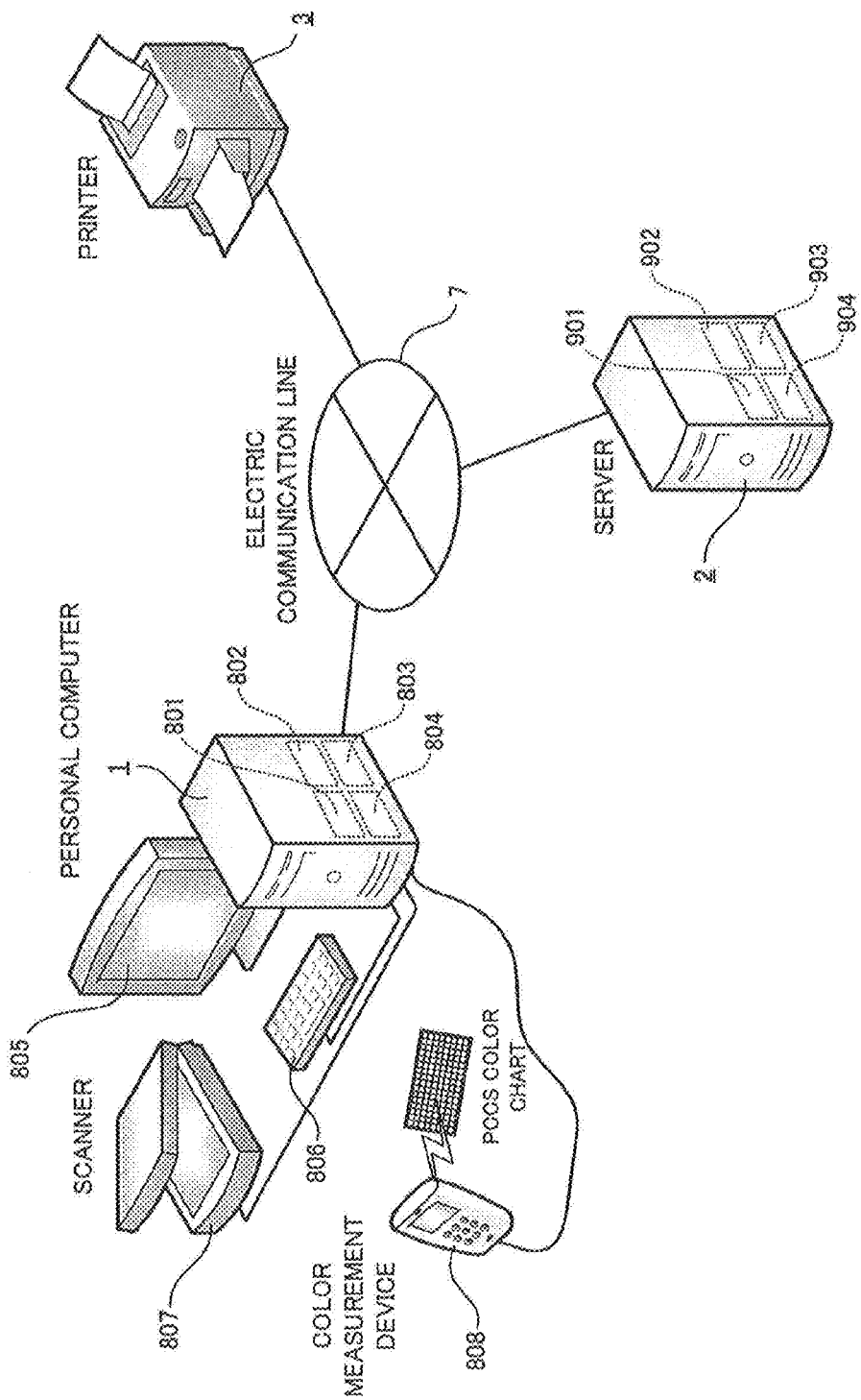
FIG. 1 is a diagram showing a system configuration of a tone management system according to an embodiment of the present invention.

Hereinafter, embodiments of the present invention will be described with reference to the drawings.
(System Configuration)
FIG. 1 is a diagram showing a system configuration of a tone management system according to the present embodiment. The tone management system according to the present embodiment can perform processing such as generating a tone definitional equation for calculating a Munsell value of color corresponding to an arbitrarily defined tone intermediate between the 12 types of tones defined in the PCCS, identifying what tone an arbitrary color belongs to, and calculating Munsell values corresponding to arbitrarily defined tones and printing a color chart in which the arbitrarily defined tones are expressed.

The tone management system shown in FIG. 1 includes, for example, a personal computer 1 serving as a user terminal, a server 2, and a printer 3. The personal computer 1, the server 2, and the printer 3 are connected in a mutually communicable manner by an electric communication line 7 such as a USB (Universal Serial Bus), a LAN (Local Area Network), and a WAN (Wide Area Net Work). The electric communication line 7 connecting such network terminals may be either wired or wireless.

Specifically, the personal computer (PC) 1 includes a CPU 801, an ASIC (Application Specific Integrated Circuit) 802, a MEMORY 803, an HDD (Hard Disk Drive) 804, a display 805, an operation input device 806, a scanner 807, and a color measurement device 808.

The CPU 801 has a function of performing various types of processing of the personal computer 1, and also has a function of implementing various functions by executing programs stored in the MEMORY 803, the HDD 804, and the like. It will be understood that the CPU 801 may be replaced with an MPU (Micro Processing Unit) that can execute equivalent arithmetic processing. Similarly, the HDD 804 may be replaced with a storage device such as a flash memory.

The MEMORY 803 may include, for example, a RAM (Random Access Memory), a ROM (Read Only Memory), a DRAM (Dynamic Random Access Memory), an SRAM (Static Random Access Memory), a VRAM (Video RAM), and/or a flash memory. The MEMORY 803 has a function of storing various types of information and programs used in the personal computer 1.

It will be understood that part or all of the processing implemented by the CPU 801 executing the programs stored in the MEMORY 803 and the HDD 804 (for example, a tone definitional equation generation program, a tone type identification program, a program for calculating a Munsell value corresponding to an arbitrarily defined tone, an image forming program, and an interface screen display program) can also be implemented in a circuit form by using the ASIC 802. Moreover, the personal computer 1 can download and obtain a program or programs to be executed by the CPU 801 from an apparatus other than the personal computer 1 (for example, the server 2 or the like) via a network if needed.

The display 805 may include, for example, electronic paper, an LCD (Liquid crystal display), an EL (Electronic Luminescence), a PDP (Plasma Display Panel), and/or a CRT (Cathode Ray Tube).

The operation input device 806 may include, for example, a Keyboard, a Mouse, a touch panel, a touchpad, a graphics tablet, and/or a dedicated button. A so-called touch panel display may be used to implement the functions of the display 805 and the operation input device 806.

The scanner 807 measures the color values of arbitrary colors on a PCCS color chart and colors of other samples.

The color measurement device 808 measures the color values of arbitrary colors on a PCCS color chart and colors of other samples. The color measurement device 808 may be one that employs, for example, "Photoelectric Tristimulus Colorimetry" as a color measurement algorithm or one that employs "Spectrophotometry" as a color measurement algorithm. Specifically, the "Photoelectric Tristimulus Colorimetry" is a technique in which three sensors having similar sensitivities to spectral sensitivities corresponding to a human eye measure a sample to directly measure tristimulus values. The "Spectrophotometry" is a technique in which a plurality of sensors spectrally disperse light reflected from a sample and measure reflectance values at respective wavelengths, and a microcomputer unit performs integral calculations on the basis of the data to calculate tristimulus values. It should be appreciated that the color measurement algorithm is not limited to the foregoing techniques, and other color measurement algorithms may be used as long as the color value of the color of the sample be measured. In the present embodiment, as an example, a spectrophotometer (model number: C2000) manufactured by Hitachi Co., Ltd. was employed.

The server 2 includes a CPU 901, an ASIC 902, a MEMORY 903, and an HDD 904.

The CPU 901 has a function of performing various types of processing in the server 2, and also has a function of implementing various functions by executing programs stored in the MEMORY 903, the HDD 904, and the like. It will be understood that the CPU 901 may be replaced with an MPU (Micro Processing Unit) that can execute equivalent arithmetic processing. Similarly, the HDD 904 may be replaced with a storage device such as a flash memory.

The MEMORY 903 may include, for example, a RAM (Random Access Memory), a ROM (Read Only Memory), a DRAM (Dynamic Random Access Memory), an SRAM (Static Random Access Memory), a VRAM (Video RAM), and/or a flash memory. The MEMORY 903 has a function of storing various types of information and programs used in the server 2.

It will be understood that part or all of the processing implemented by the CPU 901 executing the programs stored in the MEMORY 903 and the HDD 904 can also be implemented in a circuit form by using the ASIC 902. The server 2 may download and obtain a program or programs to be executed by the CPU 901 from an apparatus other than the server 2 (for example, the personal computer 1 or the like) via a network if needed.

In the present embodiment, various coefficients, data tables, and the like to be referred to when performing arithmetic processing may be stored, for example, in the HDD 804, the HDD 904, and the like. Various coefficients and the like needed for calculations do not necessarily need to be retained in the form of a data table, and may be determined by using a function or functions for calculating the same values as or similar values to those of the data table when needed. A data table does not necessarily need to be stored in a storage area as a single group of data, and may be stored as several separate data groups as long as needed pieces of information can be referred to.

The server 2 also has a role as a database in the tone management system according to the present embodiment.
(Functional Block Configuration)

Figure 2:
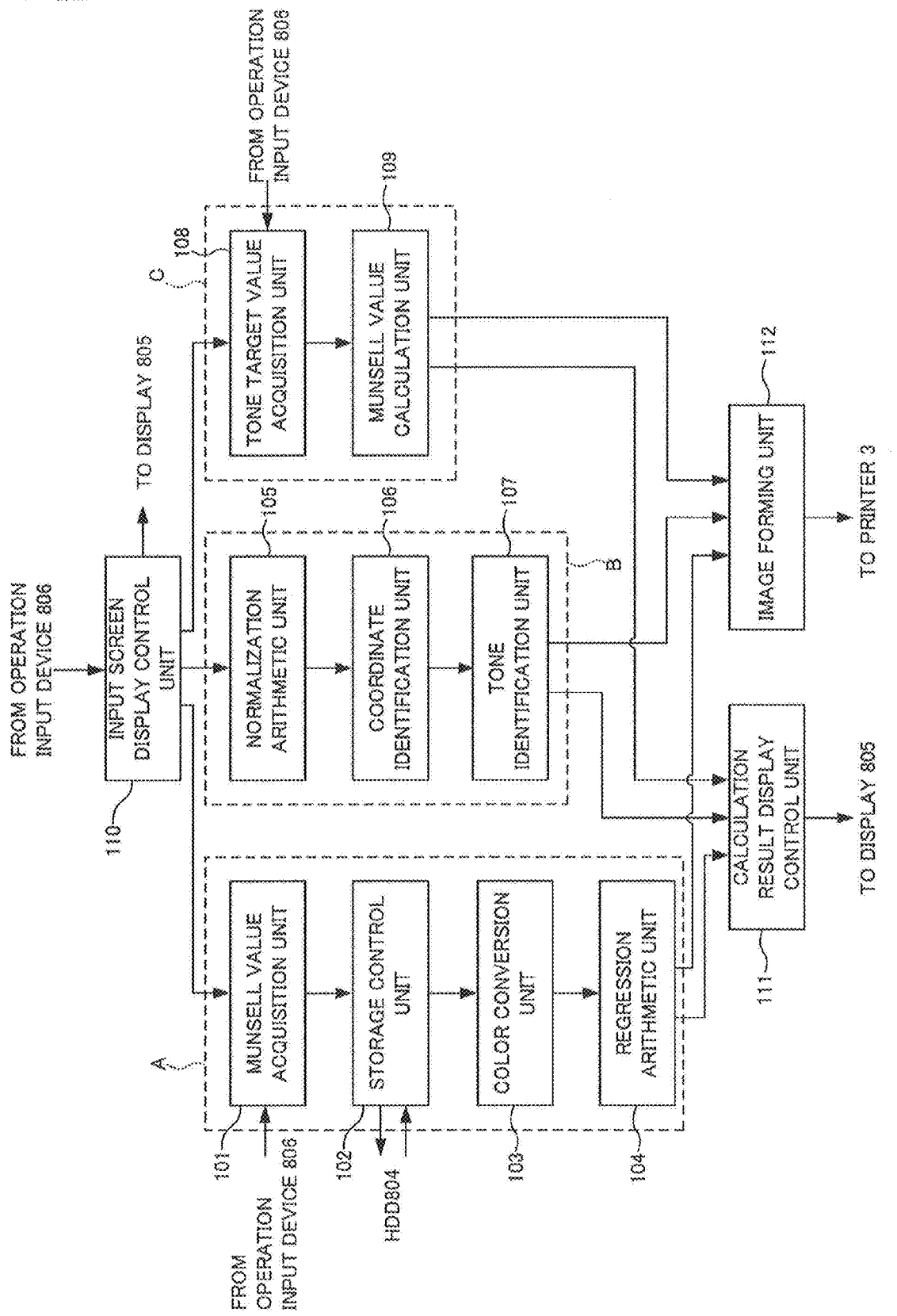
FIG. 2 is a functional block diagram of the tone management system according to the present embodiment.

Next, various functions of the tone management system according to the present embodiment will be described. FIG. 2 is a functional block diagram of the tone management system according to the present embodiment.

Specifically, the tone management system according to the present embodiment includes a Munsell value acquisition unit 101, a storage control unit 102, a color conversion unit 103, a regression arithmetic unit 104, a normalization arithmetic unit 105, a coordinate identification unit 106, a tone identification unit 107, a tone target value acquisition unit 108, a Munsell value acquisition unit 109, an input screen display control unit 110, a calculation result display control unit 111, and an image forming unit 112. Here, as an example, such functional blocks are included in the personal computer 1. However, this is not restrictive, and such functional blocks may be arranged in a distributed manner over the apparatuses constituting the tone management system as long as the entire system can implement the required functions. The respective functions of such functional blocks are implemented, for example, by the CPU 801 and the CPU 901 executing programs stored in the MEMORY 803 and the HDD 804.

The functions of the functional blocks shown in FIG. 2 will be described in detail below.

The tone management system according to the present embodiment includes groups of functional blocks, which include, for example, three classified groups A to C. The group A performs processing related to the generation of tone definitional equations. The group B performs processing related to the identification of a tone type. The group C performs processing related to the generation of Munsell values from arbitrary tone coordinates.
(Tone Definitional Equation Generation: Group A)

Initially, tone definitional equation generation processing with which the functional blocks of the group A are mainly concerned will be described. The plurality of functional blocks for executing the tone definitional equation generation processing are provided to constitute a tone definitional equation generation apparatus. In the tone definitional equation generation processing, a definitional equation is generated with respect to each of saturations to which the plurality of types of tones defined in the PCCS (Practical Color Coordinate System) belong.

The colors of color charts and color chart books are often defined in terms of coordinates of the Munsell color system. A color perception space "NT system" is said to be able to provide a rational explanation for color spaces having a certain perceptual regularity such as the Munsell color system. The NT system is a color perception space expressed by two axes, an equivalent lightness (Veq) indicating the lightness of color humanly perceived and the degree of vividness (DV) indicating the vividness of color humanly perceived.

Literature 1 "Relationships among Chromatic Tone, Perceived Lightness, and Degree of Vividness. Yoshinobu Nayatani, Hithoshi Komatsubara, COLOR research and application, Volume 30, Number 3, June 2, p. 222-234" shows conversion equations from the hue, lightness, and chroma of the Munsell color system into "DV" and "Veq" of the NT system, and shows that color values on the NT system and color values on the Munsell color system are mutually convertible.

According to JIS Z 8721, the Munsell color system is mutually convertible with Yxy of the XYZ color system, psychophysical values. Consequently, arbitrary color on the NT system is mutually convertible with color coordinates in various color spaces such as the CIELAB color system and the NCS color system which are mutually convertible with the XYZ color system via the Munsell color system.

As a result of intensive studies, the inventor of the present application has found that a quantitative model of the tone concept can be created by applying the tone concept to the NT system, and intended tone color and the psychophysical value of the color can be mutually converted via the Munsell color system.

Specifically, the foregoing Literature 1 discusses that the color values of color to be converted in the Munsell color system are converted into the equivalent lightness (Veq) indicating the lightness of the color humanly perceived and the degree of vividness (DV) indicating the vividness of the color humanly perceived by the following equations:

$$DV=C(1+k1[W-Bk]) \qquad (\text{Eq. 1}),$$

$$Veq=[W-Bk]+0.1340q(H)C+Vg+0.0872C \qquad (\text{Eq. 2}), \text{ and}$$

$$[W-Bk]=V-Vg-q(H)C \qquad (\text{Eq. 3}),$$

provided that
k1=0.1,
Vg=5.5, and
H is a hue that is a color value of the color to be converted in the Munsell color system, V is a lightness that is a color value of the color to be converted in the Munsell color system, and C is a chroma that is a color value of the color to be converted in the Munsell color system.

The value of a hue dependence coefficient q(H) is determined on the basis of FIGS. 3 and 4, which are also shown in Literature 2 "Proposal of an Opponent-Colors System Based on Color-Appearance and Color-Vision Studies. Yoshinobu Nayatani, COLOR research and apprication, Volume 29, Number 2, April 12, p 135-p 150." FIGS. 3 and 4 define color intensity values to be set according to various hues. FIG. 5 is a diagram showing a data table for determining the value of the hue dependence coefficient q(H) which is determined from the tables shown in FIGS. 3 and 4.

The equivalent lightness (Veq) can also be determined by the following simplified equation. Which equation to use to calculate the equivalent lightness (Veq), the foregoing Eq. 2 or the following Eq. 4, can be selected as appropriate according to the needed arithmetic precision etc.

$$Veq=[W-Bk]+Vg+0.0872C \qquad (\text{Eq. 4})$$

Considering that the concept of the NT system may be able to be applied to the PCCS color system which is a Hue-Tone system based on the tone concept, the inventor studied the applicability on the basis of the harmonic color chart 201 (hereinafter, HCC201) which is a representative color atlas of the PCCS color system in which respective colors are defined by the Munsell color system.

As a result of the study, the inventor has found that among the various tones defined in the PCCS:

<Chromatic Colors>
v (Vivid) pure color (vivid, colorful, flamboyant, prominent, lively),
b (Bright) tint color (bright, healthy, cheerful, gorgeous),
s (Strong) pure color (strong, loud, dynamic, passionate),
dp (Deep) shade color (dark, deep, full, traditional, Japanese-style),
lt (Light) tint color (shallow, clear, childish, refreshing, beautiful, fun),
sf (Soft) moderate color (soft, quiet, vague),
d (Dull) moderate color (dull, dusky, moderate),
dk (Dark) shade color (dark, mature, robust, ripe),
p (Pale) tint color (pale, light, plain, weak, feminine, young, gentle, thin, pretty),
ltg (Light grayish) gray color (light grayish, calm, low-key, quiet),
g (Grayish) gray color (grayish, muddy, restrained),
dkg (Dark grayish) gray color (dark grayish, somber, heavy, hard, masculine),
<Achromatic Colors>
W (White) achromatic color (white, clean, cold, fresh),
ltGy (light gray) achromatic color (light gray, cool, simple, artificial),
mGy (Medium gray) achromatic color (gray, mannish, full-fledged, modest),
dkGy (Dark gray) achromatic color (dark gray, stout, intelligent), and
Bk (Black) achromatic color (black, classy, formal, chic, stylish),
the following three groups
(1) p, ltg, g, dkg,
(2) lt, sf, d, dk, and
(3) b, s, dp
show a high correlation with respective simple linear regression lines and such simple linear regression lines do not pass through the origin point, or black point, on the space expressed by the degree of vividness (DV) and the equivalent lightness (Veq) of the NT system.

The inventor has also found that the coefficient k1 in Eq. 1 can be modified to cause the simple linear regression lines to pass through the black point and to obtain high correlation with the NT system.

Figure 6:
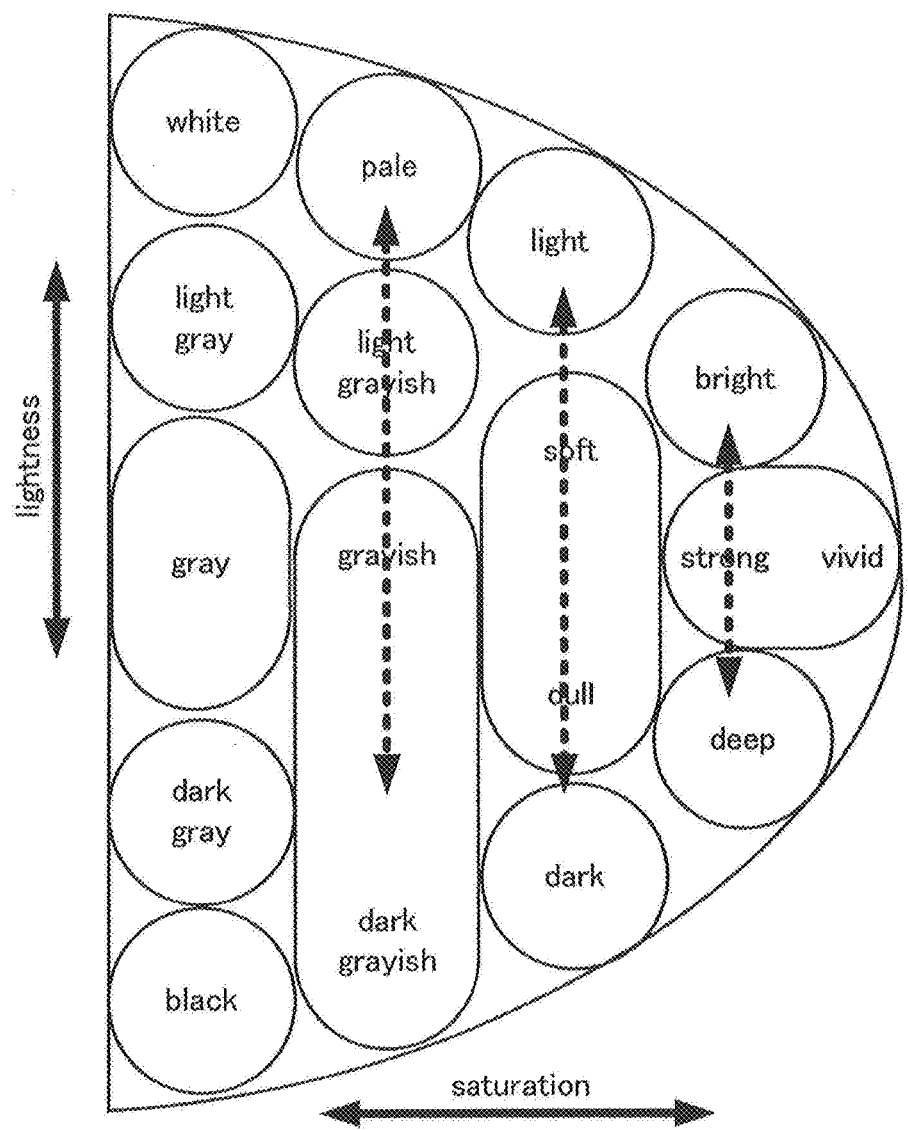
FIG. 6 is a diagram for explaining tone groupings.

Moreover, the inventor has found that these three tone groups (1) to (3) are grouped in the same manner as with "iso-saturations" (grouping indicated by the arrows) in the PCCS tone map discussed in Literature 3 "Tone Keiretsu no Settei [Setting of Tone Series], Takashi Hosono, Shikisai kenkyu (Color Research), Vol 19, No. 2, 1972" as shown in FIG. 6.

Consequently, the inventor has found as a result of years and years of trial and error that the degree of "Saturation," which is a concept of PCCS tones, can be determined by the angle that a line passing through the origin point of the rectangular coordinates of a DV' axis and a Veq axis forms with respect to the coordinate axes on a "DV'-coordinate," which is DV obtained by modifying a coefficient of the NT system, and a Veq-coordinate.

Figure 7:
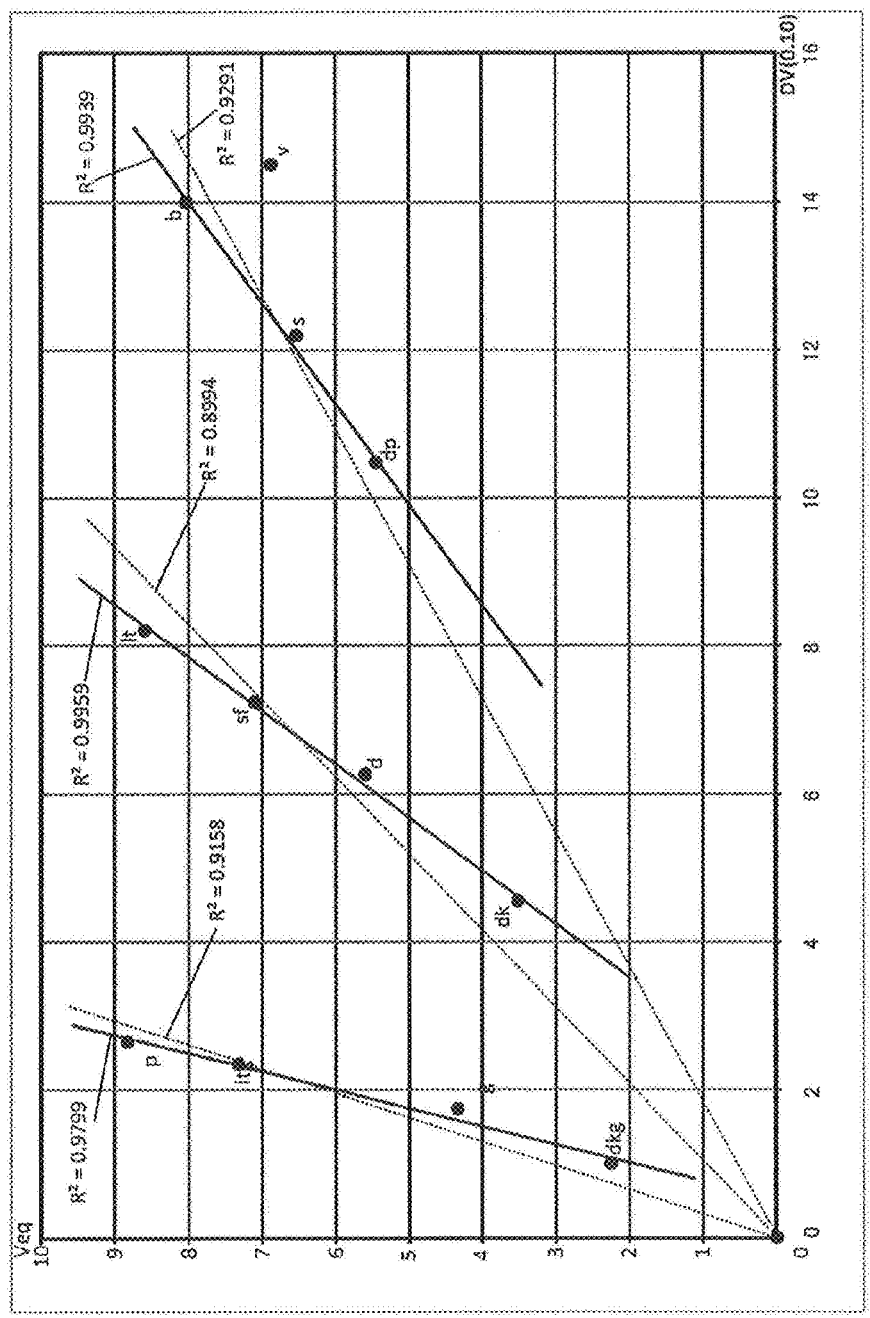
FIG. 7 is a graph showing a state where the colors of color chips of respective 12 tones in hue 2 of the harmonic color chart 201 (hereinafter, referred to as HCC201) are projected on the NT system by a CPU 801.

FIG. 7 is a graph showing, as an example, a state where data indicating the colors of color chips of respective 12 tones (p: an abbreviation of pale, ltg: lightgrey, g: gray, dkg: darkgray, lt: light, sf: soft, d: dull, dk: dark, b: bright, s: strong, dp: deep, and v: vivid) in hue 2 of the HCC201 is obtained by the CPU 801 from, for example, the HDD 804, the HDD 904, or the like and projected on the NT system by the CPU 801. In the example shown in FIG. 7, the coefficient k1 in the calculation equation (Eq. 1) of the horizontal axis DV was set to 0.10.

In FIG. 7, the full lines represent the regression equations determined for respective coherent groups of points plotted on the NT system. The dotted lines represent the regression equations determined for the respective coherent groups under the condition that the lines pass through the origin point. In chromatics, the darkest color of any saturation is expected to be black. Regression equations indicating any saturations are therefore expected to pass through the origin point which represents the black point. For example, the CPU 801 here determines the regression equations by linear regression calculations using the least square method. In the following description, linear regression calculations using the least square method shall be employed to calculate regression equations. However, this is not restrictive. It will be understood that other arithmetic techniques may be used as long as regression equations having a high coefficient of correlation can be obtained.

From FIG. 7, it can be seen that the groups of points of 12 types of tones projected on the NT system by the CPU 801 show cohesion with a high correlation with the respective saturations shown in FIG. 6. In FIG. 7, the regression line having the largest gradient shows a high correlation with the saturation to which p, ltg, g, and dkg belong. The regression line having the smallest gradient shows a high correlation with the saturation to which b, v, s, and dp belong. The regression line having the intermediate gradient shows a high correlation with the saturation to which lt, sf, d, and dk belong.

The groups of points to perform regression calculations on may be selected, for example, with respect to each of the coherent tone groups of the same saturations as described above. Groupings with which linear regression lines extending from the origin point are likely to provide a high correlation may be automatically calculated. In such a manner, regression equations can be determined for respective tone groups having the same saturations.

Figure 8:
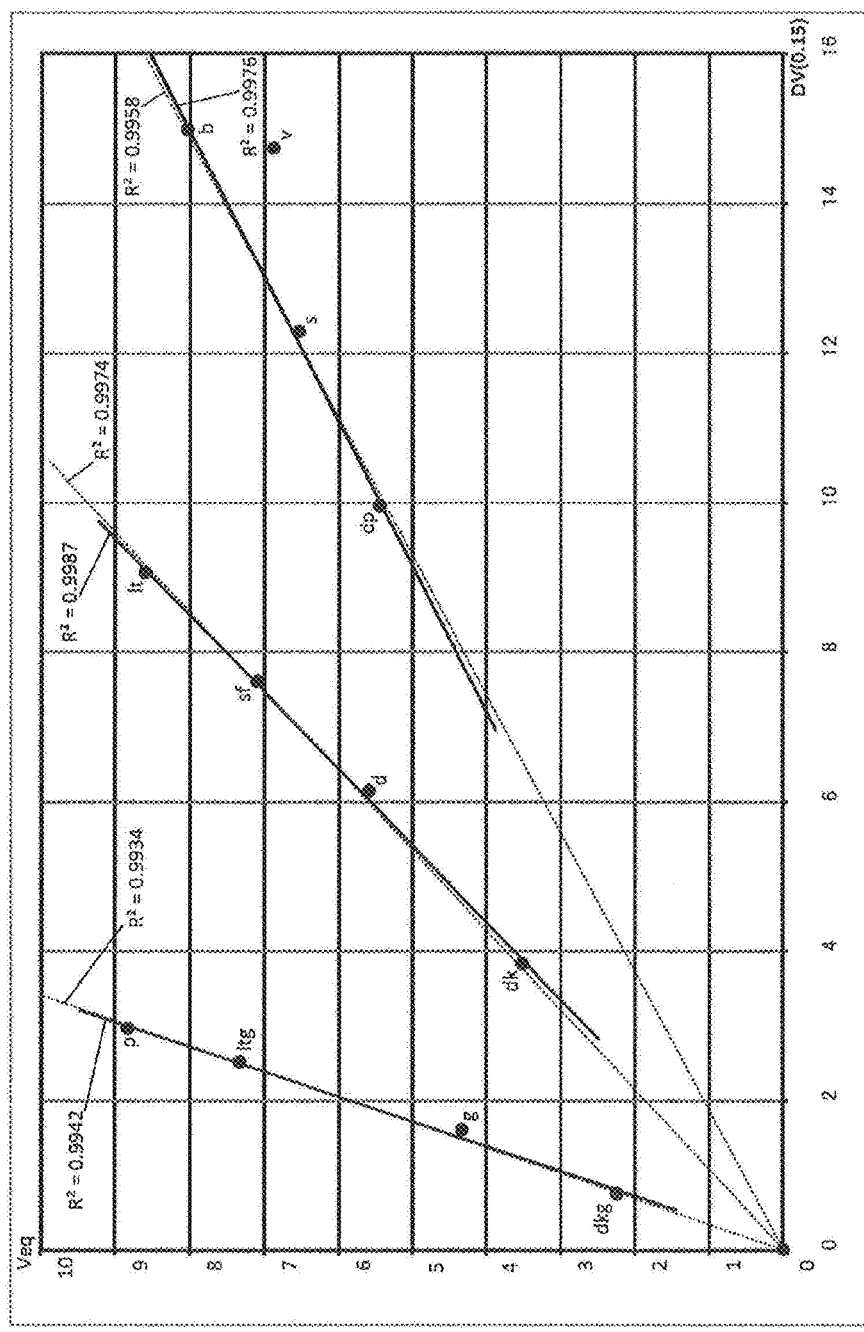
FIG. 8 is a graph showing a state where the colors of representative colors of the respective 12 tones in hue 2 of the HCC201 are projected on the NT system by the CPU 801.

FIG. 8 is a graph showing, as an example, a state where the colors of representative colors of the respective 12 tones (p, ltg, g, dkg, lt, sf, d, dk, b, v, s, and dp) in hue 2 of the HCC201 are projected on the NT system by the CPU 801. In the example shown in FIG. 8, the coefficient k1 in the calculation equation (Eq. 1) of the horizontal axis DV was set to 0.15.

Figure 9:
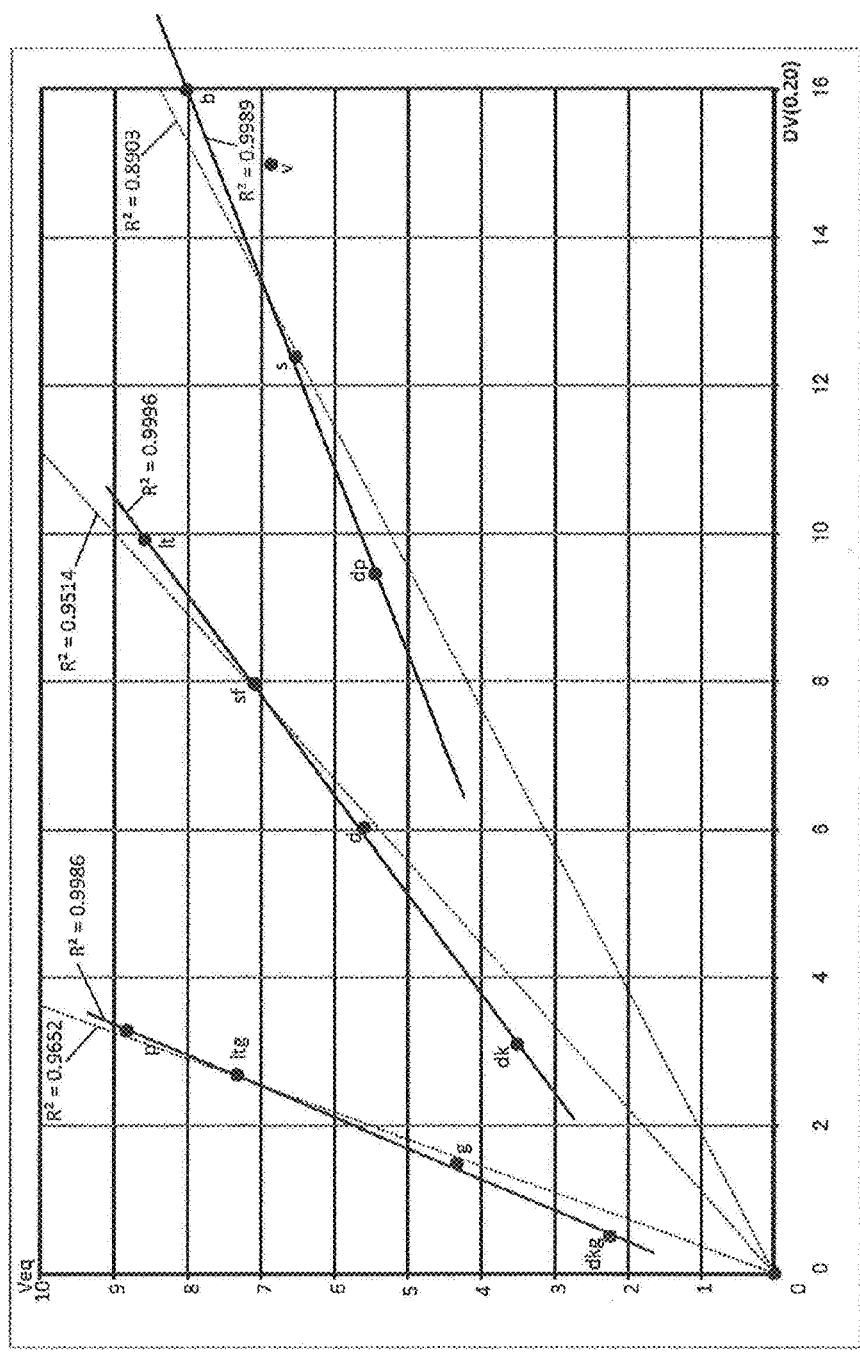
FIG. 9 is a graph showing a state where the colors of the representative colors of the respective 12 tones in hue 2 of the HCC201 are projected on the NT system by the CPU 801.

FIG. 9 is a graph showing, as an example, a state where the colors of the representative colors of the respective 12 tones (p, ltg, g, dkg, lt, sf, d, dk, b, v, s, and dp) in hue 2 of the HCC201 are projected on the NT system by the CPU 801. In the example shown in FIG. 9, the coefficient k1 in the calculation equation (Eq. 1) of the horizontal axis DV was set to 0.20.

FIG. 10 is a table comparing the coefficients of correlation of the regression equations determined for the respective examples shown in FIGS. 7 to 9. From the result shown in FIG. 10, it can be seen that the coefficients of correlation of the regression lines passing through the origin point become maximum when the colors of the representative colors of the respective 12 tones in hue 2 of the HCC201 are projected on the NT system by the CPU 801 with the coefficient k1 in the calculation equation (Eq. 1) of the horizontal axis DV set to 0.15.

Figure 11:
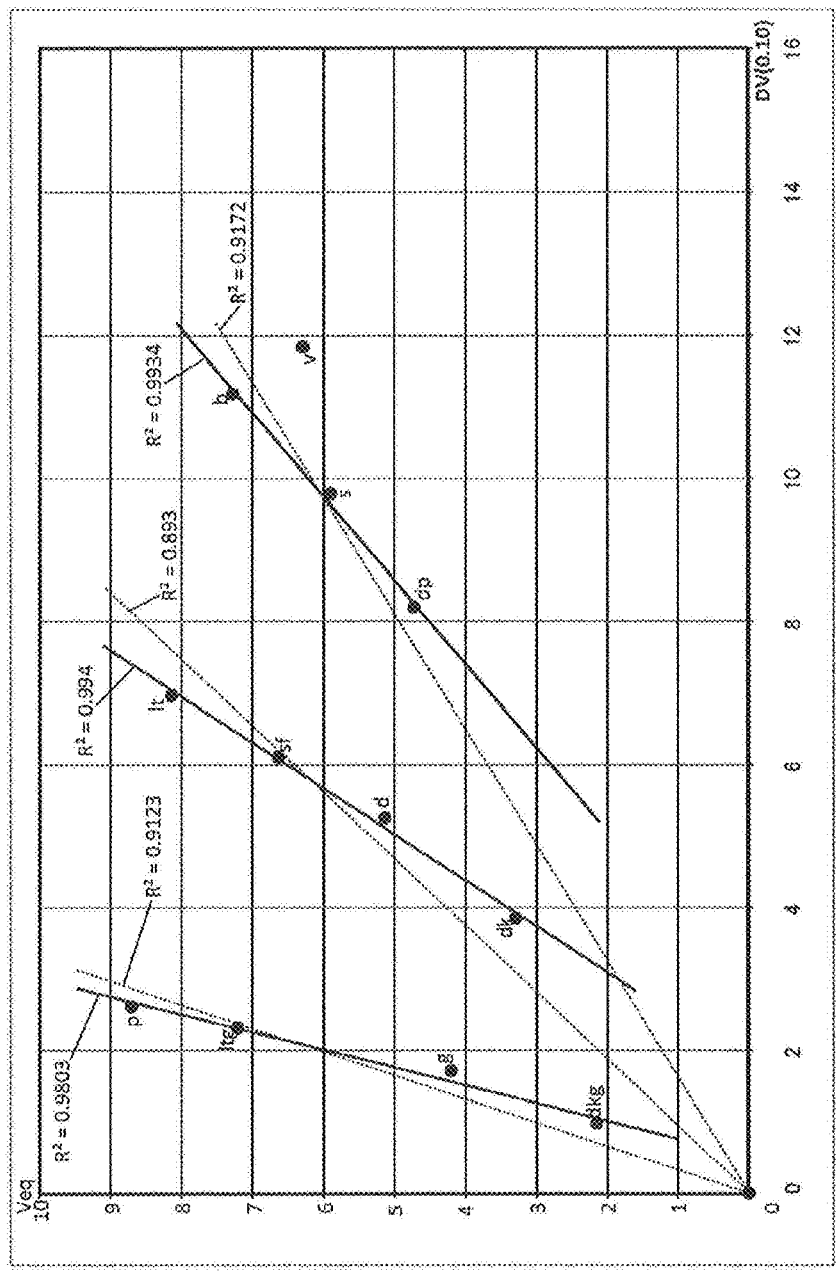
FIG. 11 is a graph showing a state where average values of representative colors of 24 types of hues belonging to the respective 12 tones on the HCC201 are projected on the NT system by the CPU 801.

FIG. 11 is a graph showing, as an example, a state where average values of the representative colors of 24 types of hues belonging to the respective 12 tones (p, ltg, g, dkg, lt, sf, d, dk, b, v, s, and dp) of the HCC201 are projected on the NT system by the CPU 801. In the example shown in FIG. 11, the coefficient k1 in the calculation equation (Eq. 1) of the horizontal axis DV was set to 0.10. The 24 hues of the HCC201 are defined as follows: Initially, hues considered to be the respective centers of red, yellow, green, and blue, called four psychological primary colors, are expressed on a color wheel (red—2:R, yellow—8:Y, green—12:G, and blue—18:B). Next, psychological complementary color hues of the four basic hues determined above are expressed in the opposite positions on the color wheel (blue green—14:BG, violet—20:V, red purple—24:RP, and yellowish orange—6:yO). Then, four hues are added to the foregoing eight hues to define 12 hues so that the intervals between the hues shift perceptively at equal rates. Intermediate hues are further interpolated to define the 24 hues.

In FIG. 11, the full lines represent the regression equations determined for the respective coherent groups of points plotted on the NT system. The dotted lines represent the regression equations determined for the respective coherent groups under the condition that the lines pass through the origin point. In chromatics, the darkest color of any saturation is expected to be black. Regression equations indicating any saturations are therefore expected to pass through the origin point which represents the black point.

From FIG. 11, it is shown that the groups of points of 12 tones projected on the NT system show cohesion with a high correlation with the respective saturations shown in FIG. 6 (indicated by the dashed arrows). In FIG. 11, the regression line having the largest gradient shows a high correlation with the saturation to which p, ltg, g, and dkg belong. The regression line having the smallest gradient shows a high correlation with the saturation to which b, v, s, and dp belong. The regression line having the intermediate gradient shows a high correlation with the saturation to which lt, sf, d, and dk belong.

Figure 12:
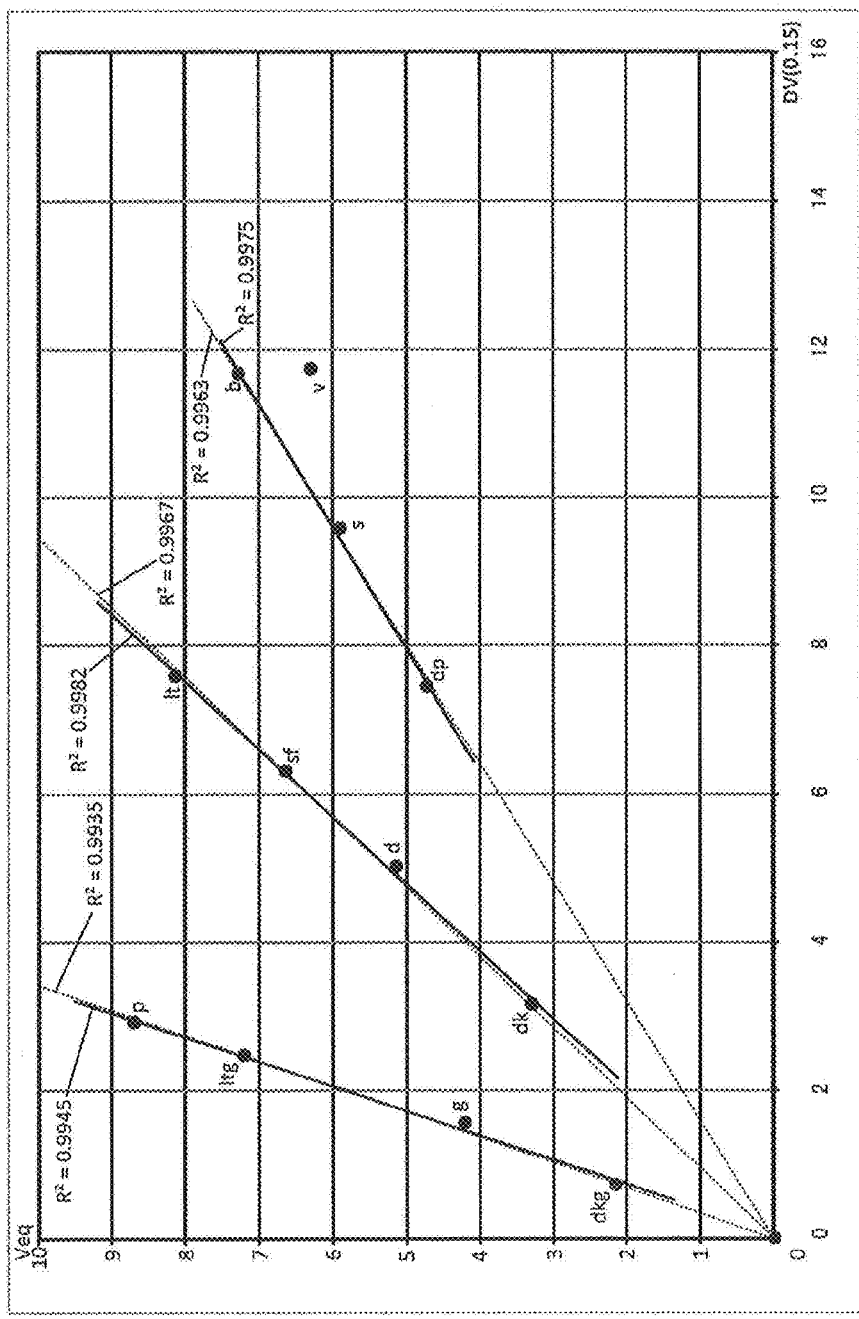
FIG. 12 is a graph showing a state where the average values of the representative colors of the 24 types of hues belonging to the respective 12 tones on the HCC201 are projected on the NT system by the CPU 801.

FIG. 12 is a graph showing, as an example, a state where the average values of the representative colors of the 24 types of hues belonging to the respective 12 tones (p, ltg, g, dkg, lt, sf, d, dk, b, v, s, and dp) of the HCC201 are projected on the NT system by the CPU 801. In the example shown in FIG. 12, the coefficient k1 in the calculation equation (Eq. 1) of the horizontal axis DV was set to 0.15.

Figure 13:
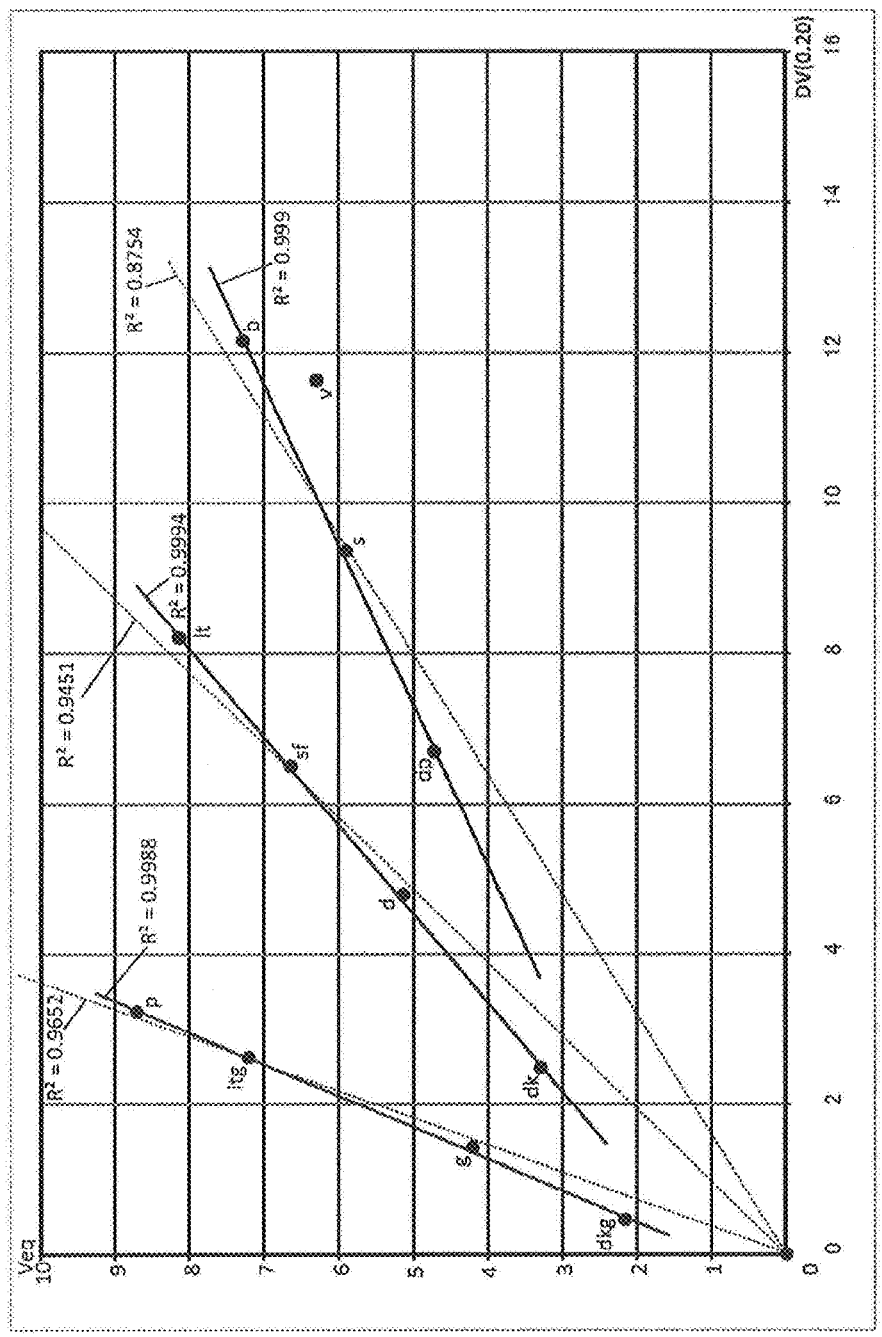
FIG. 13 is a graph showing a state where the average values of the representative colors of the 24 types of hues belonging to the respective 12 tones on the HCC201 are projected on the NT system by the CPU 801.

FIG. 13 is a graph showing, as an example, a state where the average values of the representative colors of the 24 types of hues belonging to the respective 12 tones (p, ltg, g, dkg, lt, sf, d, dk, b, v, s, and dp) of the HCC201 are projected on the NT system by the CPU 801. In the example shown in FIG. 13, the coefficient k1 in the calculation equation (Eq. 1) of the horizontal axis DV was set to 0.20.

FIG. 14 is a table comparing the coefficients of correlation of the regression equations determined for the respective examples shown in FIGS. 11 to 13. From the result shown in FIG. 14, it can be seen that the coefficients of correlation of the regression lines passing through the origin point become maximum when the average values of the representative colors of the 24 types of hues belonging to the respective 12 tones (p, ltg, g, dkg, lt, sf, d, dk, b, v, s, and dp) on the HCC201 are projected on the NT system with the coefficient k1 in the calculation equation (Eq. 1) of the horizontal axis DV set to "0.15."

Based on the foregoing, the value "0.15" at which the highest coefficients of correlation are obtained is employed as the coefficient k1 in the calculation equation (Eq. 1) of the horizontal axis DV not only when performing calculations about only hue 2 but also when performing calculations about the average values of the 24 hues. The coefficient k1=0.1 in Eq. 1 is modified into k2=0.15 to obtain Eq. 5. To make a distinction from "DV" determined from Eq. 1, the symbol is changed to "DV'":

$$DV'=C(1+k2[W-Bk]) \qquad \text{(Eq. 5)},$$

provided that k2=0.15.

In short, the inventor of the present application has derived that various tones defined in the HCC201 which is a representative color atlas of the PCCS color system can be modeled by regression equations having extremely high coefficients of correlation with the coordinate system including "DV'" and "Veq" determined from (Eq. 4).

Figure 15:
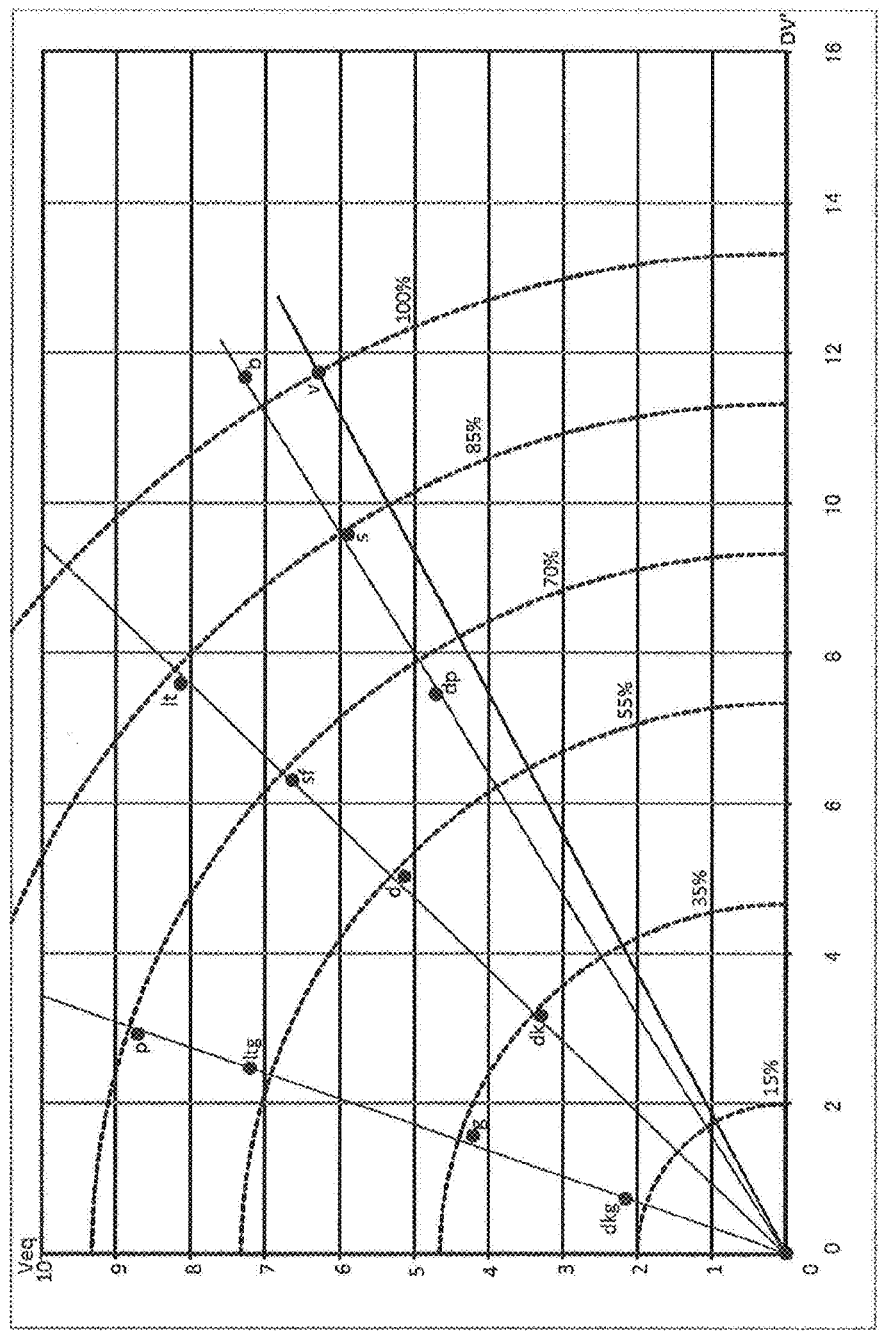
FIG. 15 is a diagram for explaining tone grouping based on a distance from an origin point (black point).
Figure 16:
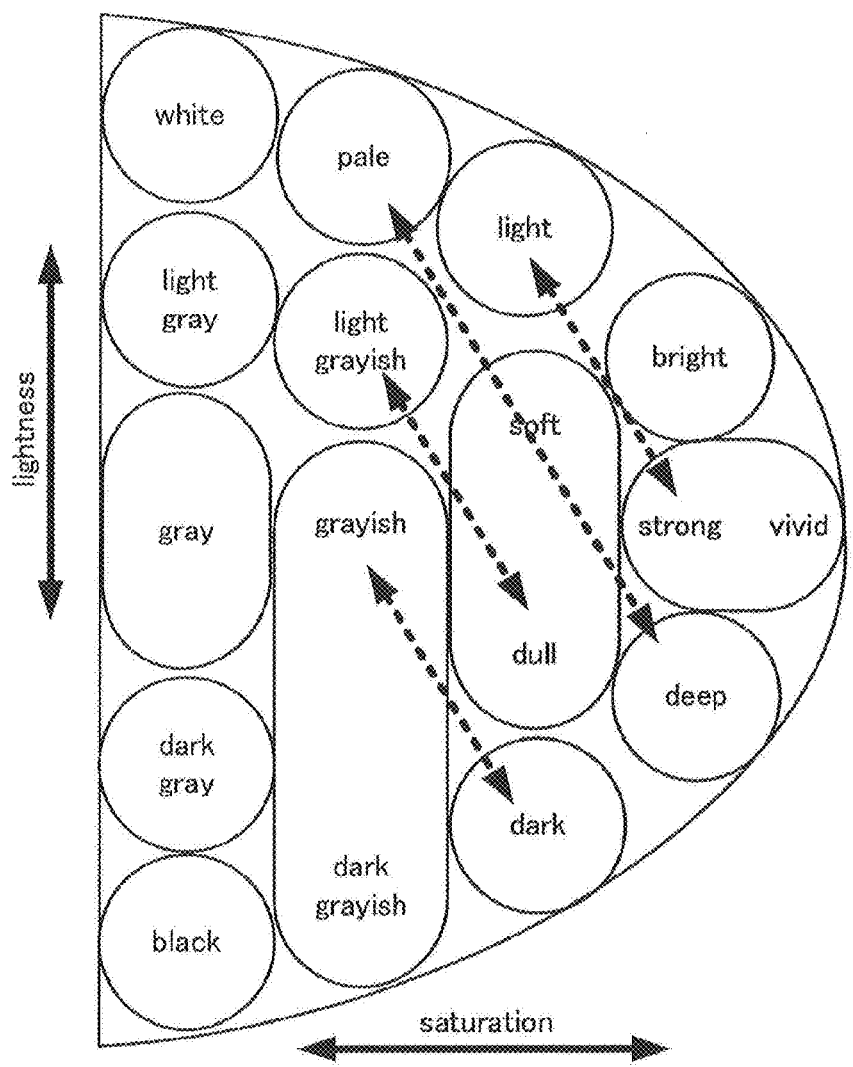
FIG. 16 is a PCCS tone map.

As a result of analysis of the tone distribution of the HCC201 on the coordinate system including the horizontal axis DV' and the vertical axis Veq, the inventor has also found that the tones can be grouped on the basis of the distance from the origin point (black point) (see FIG. 15), and such grouping corresponds to the distance from the black point on the PCCS tone map shown in FIG. 16. The distance from the origin point (black point) may be referred to as the "amount of black." The "amount of black" is a concept of the amount of perception in color dynamics. FIG. 16 shows positional relationships of four groups having different amounts of black on a conceptual diagram of PCCS tone arrangement.

According to the concept of the PCCS tones, Vivid has the highest saturation and an intermediate Lightness (at the center between white and black). The other tones are arranged with White, Black, and vivid at the vertexes. When creating actual color charts and the like, Vivid is arbitrarily set according to the gamuts of individual color materials, so that the entirety is reproduced without disturbing the positional relationships between the tones.

The inventor therefore conceived that tone coordinates could be expressed by relative coordinates within a color triangle with White, Black, and vivid as the vertexes.

More specifically, the saturation (degree of saturation) expresses the relationship between the color tone and whiteness of a color. On the color triangle formed by the pure color (vivid color), white, and black on the coordinates including the "equivalent lightness" and the "degree of vividness," the points of colors having the same saturation are considered to fall on a regression line passing through the black (origin point) of the NT system.

The (perceptual) amount of black expresses the relationship between the color tone and blackness of a color. On the color triangle formed by the pure color (vivid color), white, and black on the coordinates including the "equivalent lightness" and the "degree of vividness," the points of colors having the same amount of black are considered to be at the same distance from the black (origin point) of the NT system.

In the present embodiment, the basic gamut is expressed by the harmonic color chart 201 (HCC201) which is a representative color atlas of the PCCS color system. The coefficient k2 can be set to a value appropriate for an arbitrary gamut to achieve matching with each individual gamut.

As employed herein, the "gamut" refers to an approximate range of colors which is typically determined by the types of color materials for materializing the group of colors and/or by intended design concepts.

A group of representative colors systematically arranged in a Hue-Tone system therefore has different gamuts depending on the types of color materials (paints, inks, dyes, and the like) for materialization (color charts) and/or intended design concepts.

Since even based on the same gamut the coordinates of the psychophysical values of the colors to be materialized correspond to a gamut under a "practical condition" such as the color reproduction ranges of the color materials and intended design concepts, relative adjustments of the tones are considered to be needed.

In the present embodiment, to reduce the effects of the practical condition, either or both of DV' and Veq are normalized to express a relative positional relationship with reference to the vivid color arbitrarily selected according to the practical condition.

Vivid is a tone that is at the most colorful position in the tone concept and is most directly susceptible to the size of the gamut assumed to be materialized.

The relative position of the DV' of each tone with respect to the DV' of the vivid color is approximately constant regardless of hue. The DV' of each tone is thus expressed in a relative value with the DV' of the Vivid color as 10, and denoted by "DV*." In other words, the DV' of Vivid is determined according to the size of the assumed gamut, whereby the DV' of each tone can be determined without changing the relative positional relationship.

Figure 17:
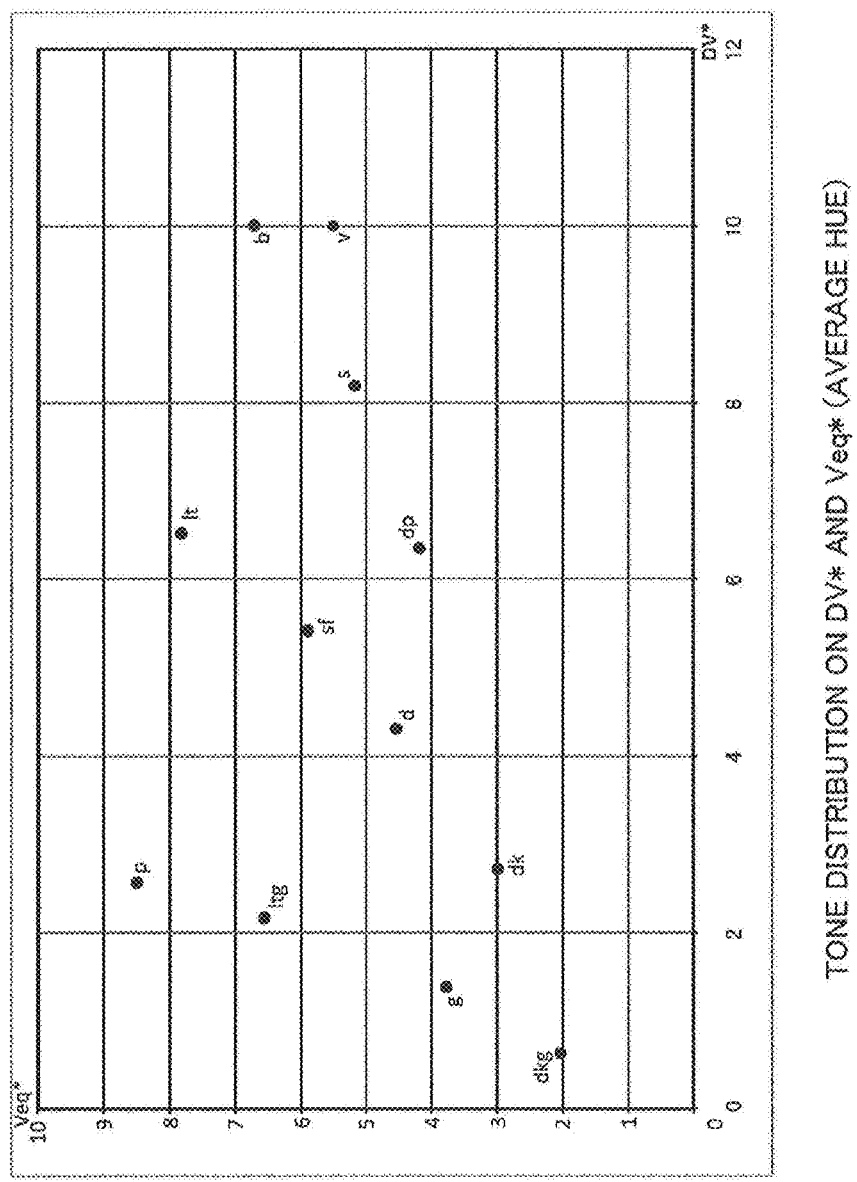
FIG. 17 is a graph showing a state where the average values of the representative colors of the 24 types of hues belonging to the respective 12 tones on the HCC201 are projected on a coordinate system including a horizontal axis DV* and a vertical axis Veq*.

Vivid conceptually is zero in the amount of whiteness and the amount of blackness, and has an intermediate Veq (here, 5.5). The Veq of each tone is thus expressed in a relative value "Veq*" with the Veq of Vivid as 5.5. This means that the Veq of Vivid is determined according to the size of the assumed gamut, whereby the Veq of each tone can be determined without changing the relative positional relationship. FIG. 17 is a graph showing a state where the average values of the representative colors of the 24 types of hues belonging to the respective 12 tones (p, ltg, g, dkg, lt, sf, d, dk, b, v, s, and dp) of the HCC201 are projected on a coordinate system including the horizontal axis DV* and the vertical axis Veq*.

The CPU 801 calculates the normalized degree of vividness DV* of arbitrary color by the following equation:

$$DV^* = DV'/DV'\_vivid \times 10,$$

where DV' is the degree of vividness of the arbitrary color on the coordinate system including the horizontal axis DV' and the vertical axis Veq, and DV'_vivid is the degree of vividness of vivid color.

The CPU 801 calculates the normalized equivalent lightness Veq* of arbitrary color by the following equations:
if Veq≥Veq_vivid, $$Veq^* = ((5.5 - Veq\_W)/(Veq\_vivid - Veq\_W)) \times (Veq - Veq\_W) + Veq\_W) \ldots \quad (Eq. 7), \text{ and}$$

if Veq<Veq_vivid, $$Veq^* = ((5.5 - Veq\_Bk)/(Veq\_vivid - Veq\_Bk)) \times (Veq - Veq\_Bk) + Veq\_Bk \ldots \quad (Eq. 8),$$

where Veq is the equivalent lightness of the arbitrary color, Veq_vivid is the equivalent lightness of vivid color in the hue of the arbitrary color, Veq_W is the Veq of white (of an actually used color material) under the practical condition, Veq_Bk is the Veq of black (of the actually used color material) under the practical condition, Veq_W=9.5, and Veq_Bk=1.5.

FIG. 18 is a table showing, as an example, the Munsell hues of representative colors of respective tones on the HCC201. FIG. 19 is a table showing, as an example, the Munsell lightnesses of the colors of color chips of the respective tones on the HCC201. FIG. 20 is a table showing, as an example, the Munsell chromas of the colors of the color chips of the respective tones on the HCC201.

FIG. 21 shows the values of [W−Bk] in respective hues calculated for respective tones by (Eq. 3). FIG. 22 shows the values of Veq in respective hues calculated for respective tones by (Eq. 2). FIG. 23 shows the values of DV in the respective hues calculated for respective tones by (Eq. 1). FIG. 24 shows the values of DV' in the respective hues calculated for respective tones by (Eq. 5). FIG. 25 shows the values of Veq* in the respective hues calculated for respective tones by (Eq. 7) or (Eq. 8). FIG. 26 shows the values of DV* in the respective hues calculated for respective tones by (Eq. 6).

FIG. 27 is a table showing the distances of the colors of the respective color chips of the HCC201 from black, obtained from the data shown in FIG. 17 and standardized by the distance of Vivid. In the diagram, for example, "1.00" of v (Vivid) means 100%, and "0.70" of dp (deep) means 70% (see FIG. 15).

As described above, as a result of the foregoing intensive studies, the inventor has made it possible to determine "DV*" and "Veq*" indicating a tone from arbitrary Munsell values by using the foregoing Eqs. 1 to 8. Points of colors having the same tone have the same values in "saturation (degree of saturation)" and "the amount of black humanly perceived" in various hues. The result shown in FIG. 27 also confirms that the points of colors having the same tone have the same values or extremely approximate values in "saturation (degree of saturation)" and "the amount of black humanly perceived" in various hues.

The inventor has also found that if an arbitrarily defined tone is given in terms of DV* and Veq*, the foregoing steps can be inversely converted to convert the given arbitrarily defined tone into Munsell values or various color systems.

For application to all arbitrary hues, q(H) for an arbitrary hue H is determined as follows: The tables of Literature 1 shown in FIGS. 3 and 4 only provide the values of q(H) for several specific Munsell hues. An interpolation method is then used to obtain q(H) for an arbitrary Munsell hue, whereby the value of q(H) corresponding to an intermediate hue between the foregoing specific Munsell hues can be obtained.

Specifically, the CPU 801 extracts the hue dependence coefficients q(H) corresponding to Munsell hues on both sides of an arbitrary Munsell hue on the basis of the tables of Literature 1 shown in FIGS. 3 and 4. The CPU 801 determines the hue dependence coefficient q(H) corresponding to the arbitrary Munsell hue by proportionally distributing the values of the hue dependence coefficients q(H) according to the value of the Munsell hue by using the following Eq. 9:

$$q(H)\_target = ((q(H)\_h - q(H) \times (H\_target - H))/(H\_h - H\_l) + q(H)\_l \ldots \quad (Eq. 9)$$

where H_target is the arbitrary Munsell hue, H_h is the Munsell hue on the positive side, H_l is the Munsell hue on the negative side, q(H)_target is q(H) corresponding to the arbitrary Munsell hue, q(H)_h is q(H) corresponding to the Munsell hue on the positive side, and q(H)_l is q(H) corresponding to the Munsell hue on the negative side.

Figure 28:
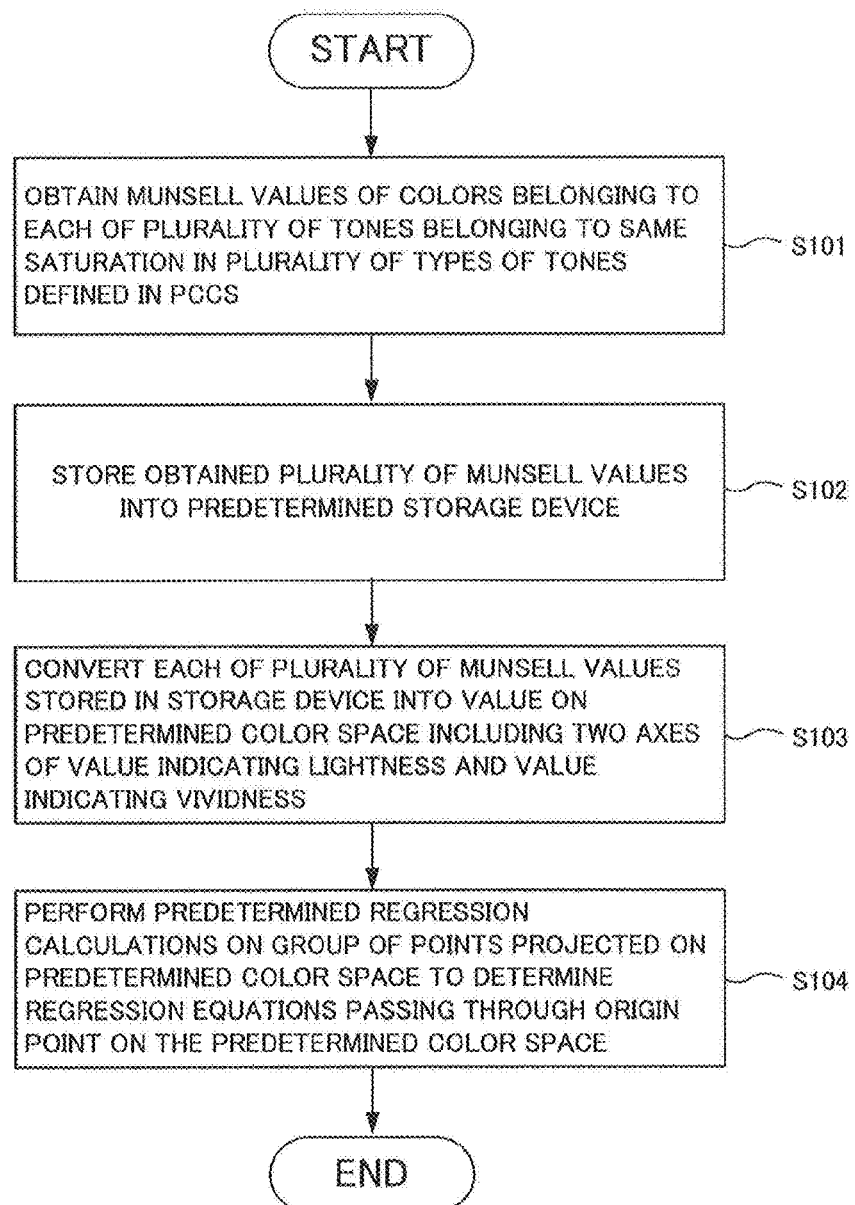
FIG. 28 is a flowchart showing a flow of tone definitional equation generation processing (tone definitional equation generation method) performed by the CPU 801.

FIG. 28 is a flowchart showing the flow of the tone definitional equation generation processing (tone definitional equation generation method) performed by the CPU 801.

Initially, the CPU 801 (computer) obtains the Munsell values of colors belonging to each of a plurality of tones belonging to the same saturation in the plurality of types of tones defined in the PCCS (Practical Color Co-ordinate System) (a function of the Munsell value acquisition unit 101: S101). Specifically, the CPU 801 may obtain Munsell values on the basis of user's operation inputs to the operation input device 806. The CPU 801 may obtain Munsell values by measuring the Munsell values of the colors of the HCC201 and the like by using the color measurement device 808. The CPU 801 may obtain Munsell values by scanning the Munsell values of the colors of the HCC201 and the like by using the scanner 807. The CPU 801 may obtain Munsell values as data from a PCCS database stored in the HDD 804 or the HDD 904 in advance.

Next, the CPU 801 (computer) stores the obtained plurality of Munsell values into the HDD 804 or the HDD 904 (predetermined storage device) (a function of the storage control unit 102: S102).

Next, the CPU 801 (computer) converts each of the plurality of Munsell values stored in the HDD 804 or the HDD 904 into a value on a predetermined color space including two axes of a value indicating a lightness and a value indicating vividness (a function of the color conversion unit 103: S103).

The CPU 801 (computer) then performs predetermined regression calculations on the group of points projected on the predetermined color space to determine regression equations passing through the origin point on the predetermined color space (a function of the regression arithmetic unit 104: S104).

In such a manner, tone definitional equations can be generated to determine the XYZ values of colors belonging to the same tone in various hues.

(Identification of Tone Type: Group B)

Next, tone type identification processing with which the functional blocks of the group B are mainly concerned will be described. The plurality of functional blocks for performing the tone type identification processing are provided to constitute a tone type identification apparatus.

The functional blocks of the group B can perform conversion processing from Munsell values arbitrarily designated by the user to tone coordinates (DV*, Veq*). In such a manner, for example, which of the plurality of types of tones defined in the PCCS (Practical color Co-ordinate System) Munsell values, color values in the Munsell color system, belong to is identified.

Figure 29:
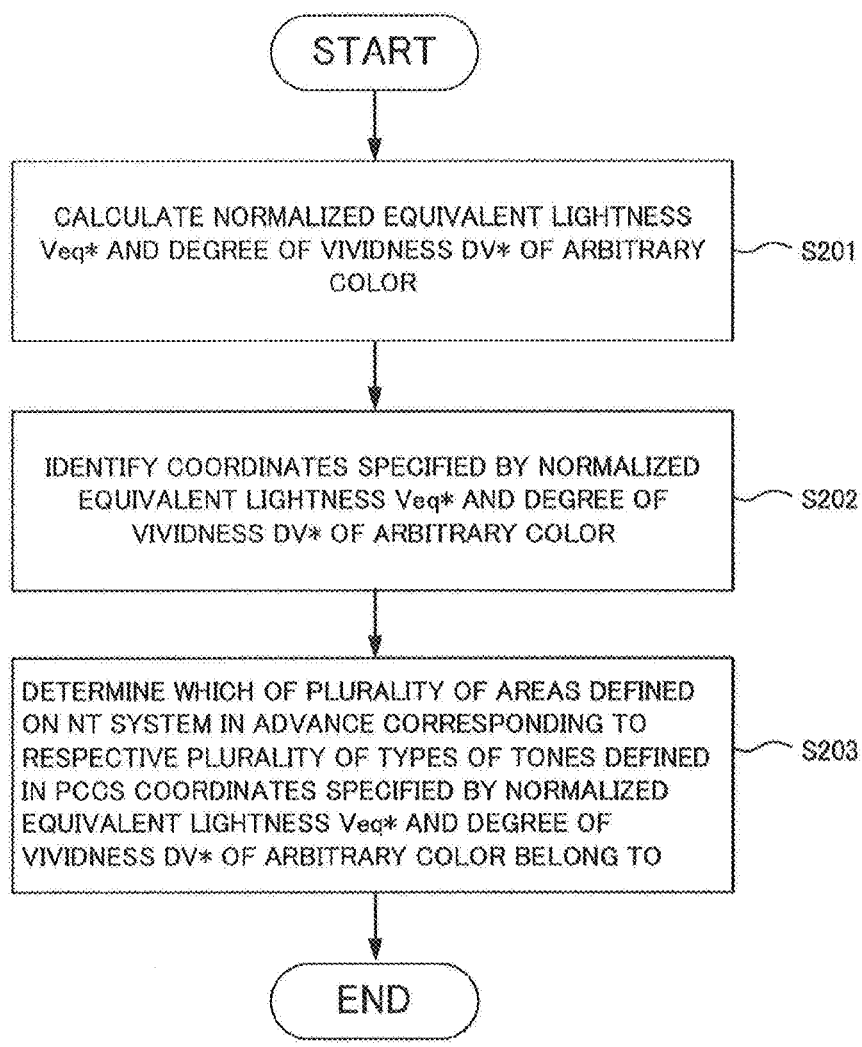
FIG. 29 is a flowchart showing a flow of tone type identification processing (tone type identification method) performed by the CPU 801.

Hereinafter, details (tone type identification method) of the processing functions of the functional blocks constituting the group B will be described. FIG. 29 is a flowchart showing the flow of the tone type identification processing (tone type identification method) performed by the CPU 801.

The normalization arithmetic unit 105 (CPU 801) determines an equivalent lightness Veq_target indicating a lightness humanly perceived of color to be identified, an equivalent lightness Veq_vivid indicating the lightness of color humanly perceived of vivid color of an actually used color material, the degree of vividness DV'_target indicating the vividness of color humanly perceived of the color to be identified, and the degree of vividness DV'_vivid indicating the vividness of color humanly perceived of the vivid color by the following equations:

$$DV'\_target = C\_target(1+k2[W-Bk]) \quad \text{(Eq. 10),}$$

$$Veq\_target=[W-Bk]+0.1340q(H)C\_target+Vg+0.0872C\_target \quad \text{(Eq. 11),}$$

$$[W-Bk]=V\_target-Vg-q(H)C\_target \quad \text{(Eq. 12),}$$

$$DV'vivid=C\_vivid(1+k2[W-Bk]) \quad \text{(Eq. 13),}$$

$$Veq\_vivid=[W-Bk]+0.1340q(H)C\_vivid+Vg+0.0872C\_vivid \quad \text{(Eq. 14), and}$$

$$[W-Bk]=V\_vivid-Vg-q(H)C\_vivid \quad \text{(Eq. 15),}$$

where k2=0.15, Vg=5.5, the hue dependence coefficient q(H) has a value given by FIGS. 3 and 4, H_target is a hue that is a color value of the color to be identified in the Munsell color system, V_target is a lightness that is a color value of the color to be identified in the Munsell color system, C_target is a chroma that is a color value of the color to be identified in the Munsell color system, V_vivid is a lightness that is a color value of the vivid color of the actually used color material in the Munsell color system, and C_vivid is a chroma that is a color value of the vivid color of the actually used color material in the Munsell color system.

The normalization arithmetic unit 105 (CPU 801) calculates the normalized equivalent lightness Veq* and degree of vividness DV* of arbitrary color (S201) by the following equations:

If Veq_target≥Veq_vivid, $$Veq^*=((5.5-Veq\,W)/(Veq\,vivid-VeqW)) \times (Veq\,target-Veq\,W)+Veq\,W\ldots \quad \text{(Eq. 16),}$$

If *Veq target<Veq vivid*, $$Veq^*=((5.5-Veq\,Bk)/(Veq\,vivid-Veq-Bk)) \times (Veq\,target-Veq\,Bk)+Veq\,Bk\ldots \quad \text{(Eq. 17), and}$$

$$DV^*=DV'target/DV'\,vivid \times 10\ldots \quad \text{(Eq. 18),}$$

where Veq_W is the Veq of white that can be expressed by the actually used color material and Veq_Bk is the Veq of black that can be expressed by the actually used color material.

The coordinate identification unit 106 (CPU 801) identifies coordinates specified by the calculated normalized equivalent lightness Veq* and degree of vividness DV* of the arbitrary color on the color perception space including the two axes of the normalized equivalent lightness Veq* and degree of vividness DV* (S202).

The tone identification unit 107 (CPU 801) determines which of a plurality of areas defined on the NT system in advance corresponding to the respective plurality of types of tones defined in the PCCS (Practical Color Co-ordinate System) the coordinates specified by the calculated normalized equivalent lightness Veq* and degree of vividness DV* of the arbitrary color belong to (S203).

Hereinafter, a specific example of the arithmetic processing by the tone type identification method according to the present embodiment will be described.

Suppose that arbitrary Target color has Munsell values of (H=10R, V=4, C=11), Vg=5.5, and the Vivid tone has Munsell values of (H=10R, V=5.5, C=14).

If the Munsell H (Munsell Hue)=10R, from FIGS. 3 to 5: q(H) =−0.035.

Vivid Color $$[W-Bk]=V-Vg-q(H)C=0.49,$$

$$Veq\_vivid\,[W-Bk]+0.1340q(H)C+Vg+0.0872C=7.15,$$

$$DV=C(1+k1[W-Bk]) \text{ provided that } k\,1=0.1=14.69,$$

$$DV'\_vivid=C(1-k2[W-Bk]) \text{ provided that } k2=0.15=15.03, \text{ and}$$

$$Veq^*=(5.5-9.5)/(Veq\,vivid-9.5) \times (Veq\_vivid-9.5)+9.5=5.50.$$

Target Color $$[W-Bk]=V-Vg-q(H)C=-1.12,$$

$$Veq=[W-Bk]+0.1340q(H)C+Vg+0.0872C=5.29,$$

$$DV=C(1+k1[W-Bk]) \text{ provided that } k1=0.1=9.77,$$

$$DV'=C(1+k2[W-Bk]) \text{ provided that } k2=0.15=9.16,$$

$$DV^*=DV'/DV'vivid \times 10=6.10, \text{ and}$$

$$Veq^*=(5.5-1.5)/(Veq\,vivid-1.5) \times (Veq-1.5)+1.5=4.19$$

Thus, the Target color (H=10R, V=4, C=11) is found to have a tone of (Veq*=4.19, DV*=6.10).

(Generation of Munsell Values from Arbitrary Tone Coordinates: Group C)

Next, processing for generating Munsell values from arbitrary tone coordinates, with which the functional blocks of the group C are mainly concerned, will be described. The plurality of functional blocks for performing the processing for generating Munsell values from tone coordinates are provided to constitute an apparatus for generating Munsell values from tone coordinates.

Figure 30:
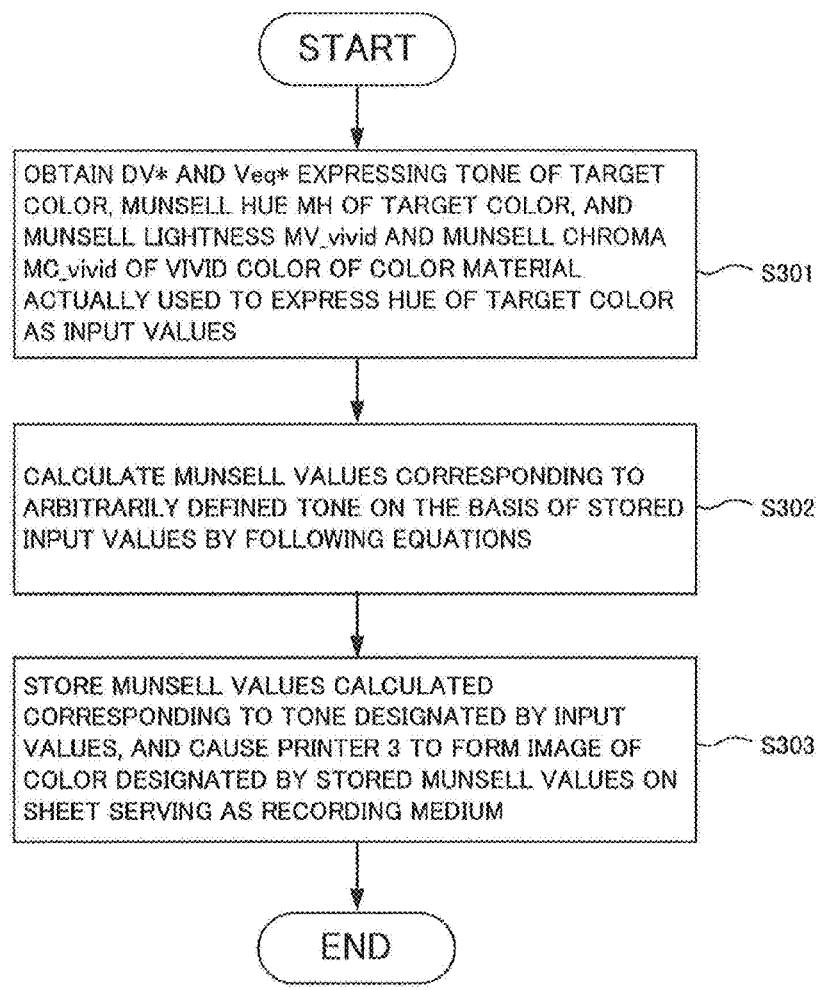
FIG. 30 is a flowchart showing processing for calculating Munsell values corresponding to an arbitrarily defined tone, performed by the CPU 801.

The respective functional blocks constituting the group C can perform processing for calculating Munsell values expressing a tone corresponding to coordinate values arbitrarily designated in the color perception space including the two axes of the normalized equivalent lightness Veq* and degree of vividness DV* on the basis of the coordinate values. FIG. 30 is a flowchart showing processing for calculating Munsell values corresponding to an arbitrarily defined tone, performed by the CPU 801.

The tone target value acquisition unit 108 (CPU 801) obtains DV* and Veq* expressing the tone of target color, a Munsell hue MH of the target color, and a Munsell lightness MV_vivid and a Munsell chroma MC_vivid of Vivid color of a color material actually used to express the hue of the target color as input values (S301). The CPU 801 stores the obtained input values, for example, into the HDD 804 or the like (predetermined storage device).

The Munsell value calculation unit 109 (CPU 801) calculates Munsell values corresponding to the tone designated by the input values stored in the HDD 804 or the like on the basis of the input values (S302) by the following equations. FIG. 31 is a table showing $q(H)$ values corresponding to Munsell hues.

<Denormalize DV with Vivid Color (DV* to DV')>

$$DV'vivid = MC\_vivid \times (1 + 0.15 \times [W-Bk]) \ldots \quad \text{(Eq. 20)},$$

$$Veg' vivid = [W-Bk] + Vg + 0.0872 \times MC\ vivid \ldots \quad \text{(Eq. 21), and}$$

$$[W-Bk] = MV\ vivid - Vg - q(MH\ vivid) \times MC\ vivid \ldots \quad \text{(Eq. 22)},$$

where $q(H)$ is an experimental value according to the NT system (corresponding to the Munsell hue of the target color) (FIG. 31), and where Vg=5.5, and $$MH\_Vivid = MH \ldots \quad \text{(Eq. 23)}.$$

<Determine Munsell Chroma MC from Target Color Tone>

$$DV' = -0.01308 \times MC^2 + (0.15 \times Veq' + 0.175) \times MC$$

is inversely converted to obtain $$MC = -25/654(5^{\wedge}0.5^* \times (-10464 DV' + 4500 Veq'^2 + 10500 Veq' + 6125)^{\wedge}0.5 - 150 Veq' - 175) \ldots \quad \text{(Eq. 24)},$$

provided that Veq'=Veq*.

<Determine Munsell Lightness MV from Target Color Tone>

$$MV = (((DV' - MC)/0.15)/MC) + Vg + q(MH) \times MC \quad \text{(Eq. 25)}$$

provided that $q(H)$ is an experimental value according the NT system (corresponding to the Munsell hue of the target color) (FIG. 31), and Vg=5.5.

The image forming unit 112 (CPU 801) stores the Munsell values calculated correspondingly to the tone designated by the input values into the HDD 804, the HDD 904, or the like, and causes the printer 3 to form an image of the color designated by the Munsell values stored in the HDD 804, the HDD 904, or the like on a sheet serving as a recording medium (S303).

The input screen display control unit 110 (CPU 801) causes the display 805 to display a user interface for obtaining DV* and Veq* expressing the tone of the target color, the Munsell hue MH of the target color, and the Munsell lightness MV_vivid and the Munsell chroma MC_vivid of the Vivid color of the color material actually used to express the hue of the target color as input values.

FIG. 32 is a diagram showing an example of a user interface screen that the input screen display control unit 110 causes the display 805 to display.

As shown in FIG. 32, the CPU 801 can cause the display unit 805 to display an interface screen in which DV* and Veq* expressing the tone of the target color, the Munsell hue HM of the target color, and the Munsell lightness MV_vivid and the Munsell chroma MC_vivid of the vivid color of the color material actually used to express the hue of the target color are directly input as numerical values.

Moreover, the CPU 801 can cause the display unit 805 to display an interface screen in which DV* and Veq* expressing the tone of the target color constituting the input values are specified in terms of the angular position about the origin point for specifying saturation and the distance from the origin point for specifying the amount of black in the color perception space including the two axes of the normalized equivalent lightness Veq* and degree of vividness DV*.

Figure 33:
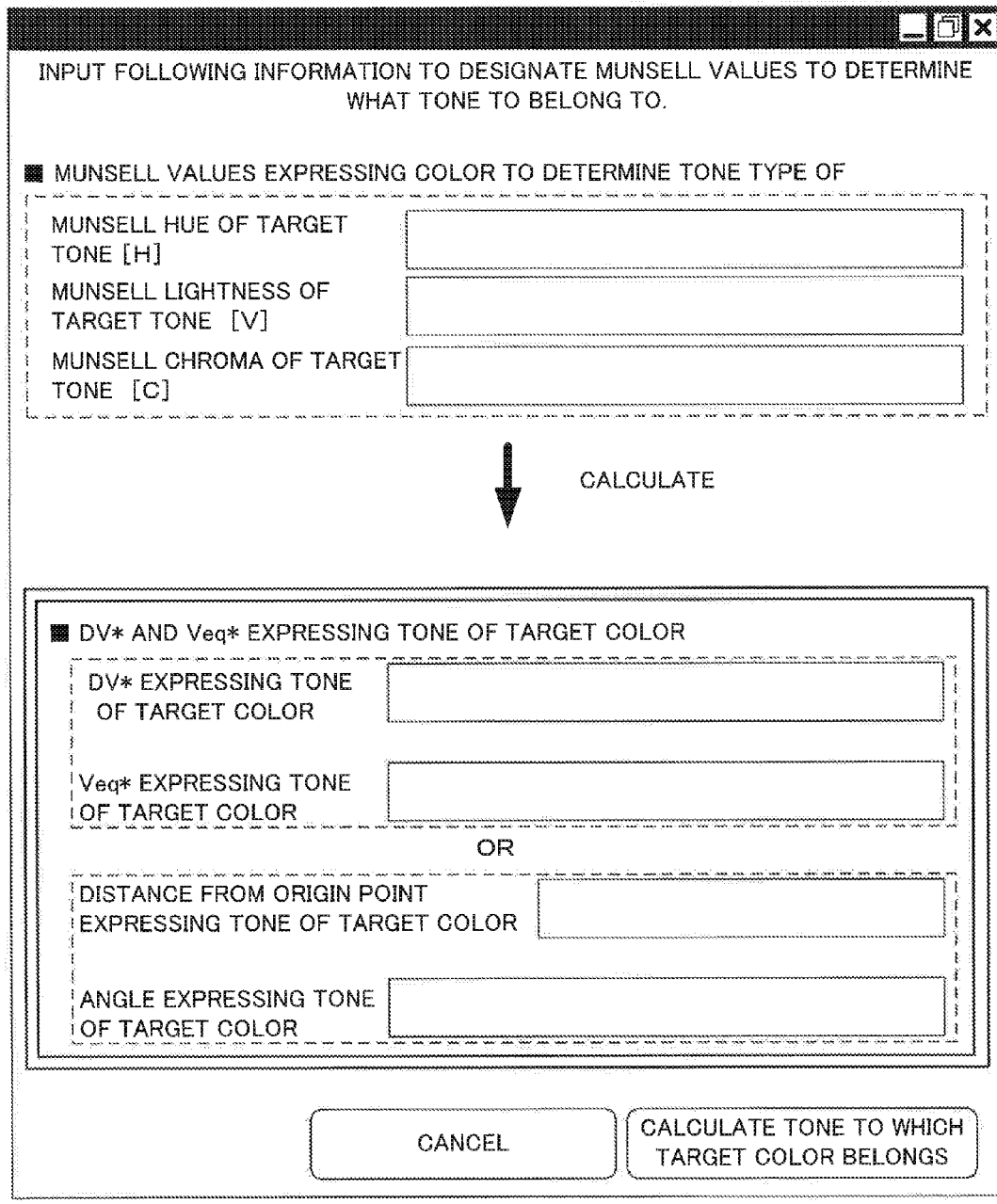
FIG. 33 is a diagram showing an example of a user interface screen that the input screen display control unit 110 causes the display 805 to display.

Moreover, as shown in FIG. 33, the CPU 801 can cause the display 805 to display an interface screen that displays DV* and Veq* expressing the tone of the target color or the angular position about the origin point for specifying saturation and the distance from the origin point for specifying the amount of black in the color perception space including the two axes of the normalized equivalent lightness Veq* and degree of vividness DV* as output values, with the Munsell hue, Munsell lightness, and Munsell chroma of the target tone as input values.

Furthermore, the CPU 801 may obtain the Munsell lightnesses MV_vivid and the Munsell chromas MC_vivid of Vivid colors of a respective plurality of types of color materials actually used to express the hue of the target color and store the Munsell lightnesses MV_vivid and the Munsell chromas MC_vivid into the HDD 804, the HDD 904, or the like. The CPU 801 may calculate Munsell values corresponding to an arbitrarily defined tone obtained with the lowest values of the obtained Munsell lightnesses MV_vivid and the Munsell chromas MC_vivid as input values.

The calculation result display control unit 111 (CPU 801) stores the Munsell values calculated corresponding to the tone designated by the input values into the HDD 804 or the like, and causes the display 805 to display on-screen an image of the color (or values indicating the color) designated by the Munsell values stored in the HDD 804 or the like. In such a manner, the personal computer 1 and the like can also function as an interface screen display apparatus.

A specific example of the processing for generating Munsell values from arbitrary tone coordinates (DV*, Veq*) according to the present embodiment will be described below. Input values DV*=10.0, Veq*=7.441, and a Munsell hue MH=2.5R expressing the tone of the target color A Munsell lightness MV vivid=2.5R and a Munsell chroma MC vivid=14.0 of Vivid color serving as a reference in the target color hue Denormalize DV with Vivid Color (DV* to DV')

$$DV'vivid = MC\ vivid \times (1 + 0.15 \times [W-Bk]) = 15.512,$$

$$Veq'vivid = [W-Bk] + Vg + 0.0872 \times MC\ vivid = 7.441,$$

$DV' = DV^*/10 \times DV'\text{vivid} = 15.512$, and $[W-Bk] = MV\text{vivid} - Vg - q(MH\text{vivid}) \times MC\text{vivid} = 0.72$, provided that $q(H)$ is −0.108 from FIG. 31,
Vg=5.5, and
$MH\text{vivid} = MH$,
provided that $Veq = Veg^*$.
Determine Munsell Chroma MC from Target Color Tone $MC = -25/654(5\char`^0.5^* \times (-10464DV' + 4500Veq'^2 + 10500Veq' + 6125)\char`^0.5 - 150Veq' - 175)$ thus, MC=14.
Determine Munsell Lightness MV from Target Color Tone $MV = ((DV' - MC)/0.15)/MC + Vg + q(MH) \times MC = 4.7$ provided that $q(H)$ is −0.108 from FIG. 31, and
Vg=5.5.

Note that the foregoing embodiment has dealt with the NT system as an example of the color space on which the tones defined in the PCCS are projected. However, the color space is not necessarily limited thereto.

Figure 34:
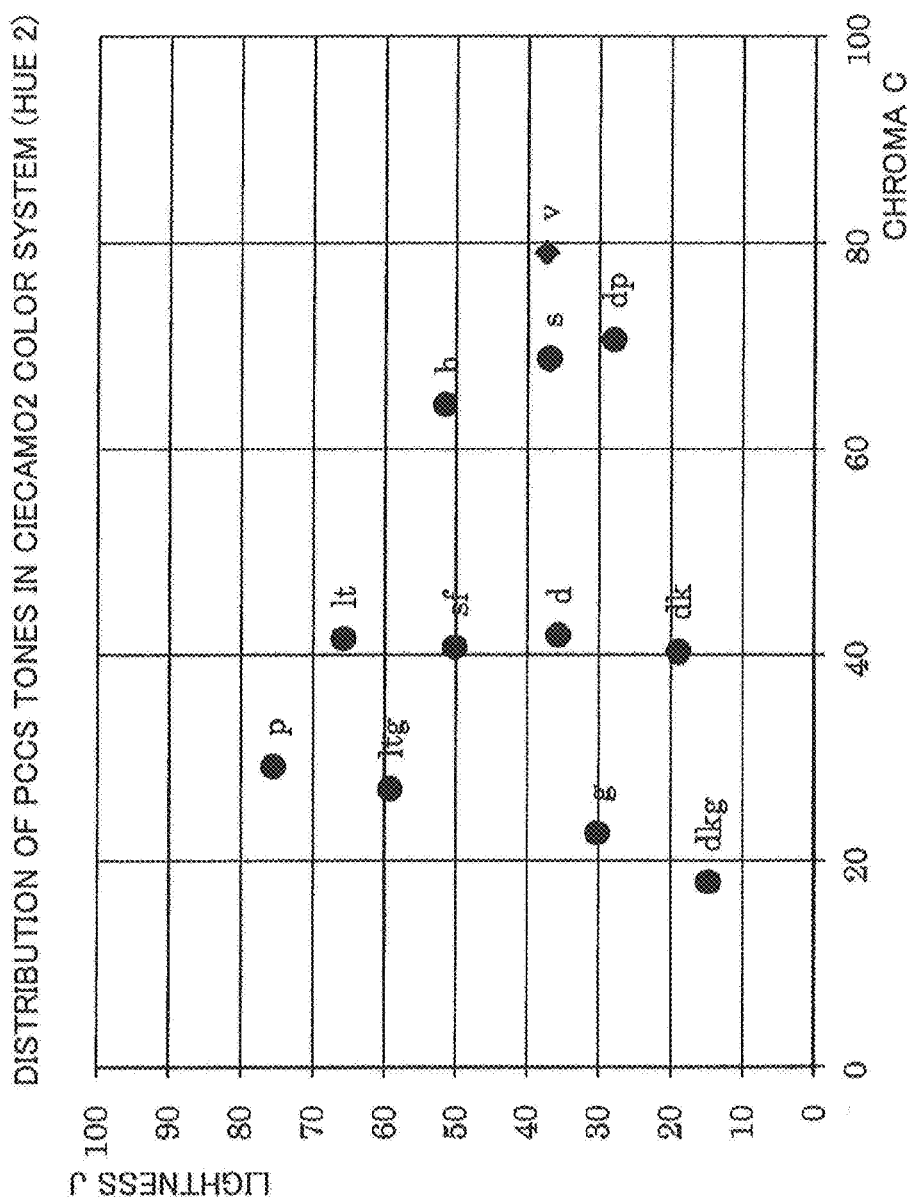
FIG. 34 is a graph showing a state where the colors of representative colors of the respective 12 tones in hue 2 of the HCC201 are projected on a CEICAMO2 color system by the CPU 801.
Figure 35:
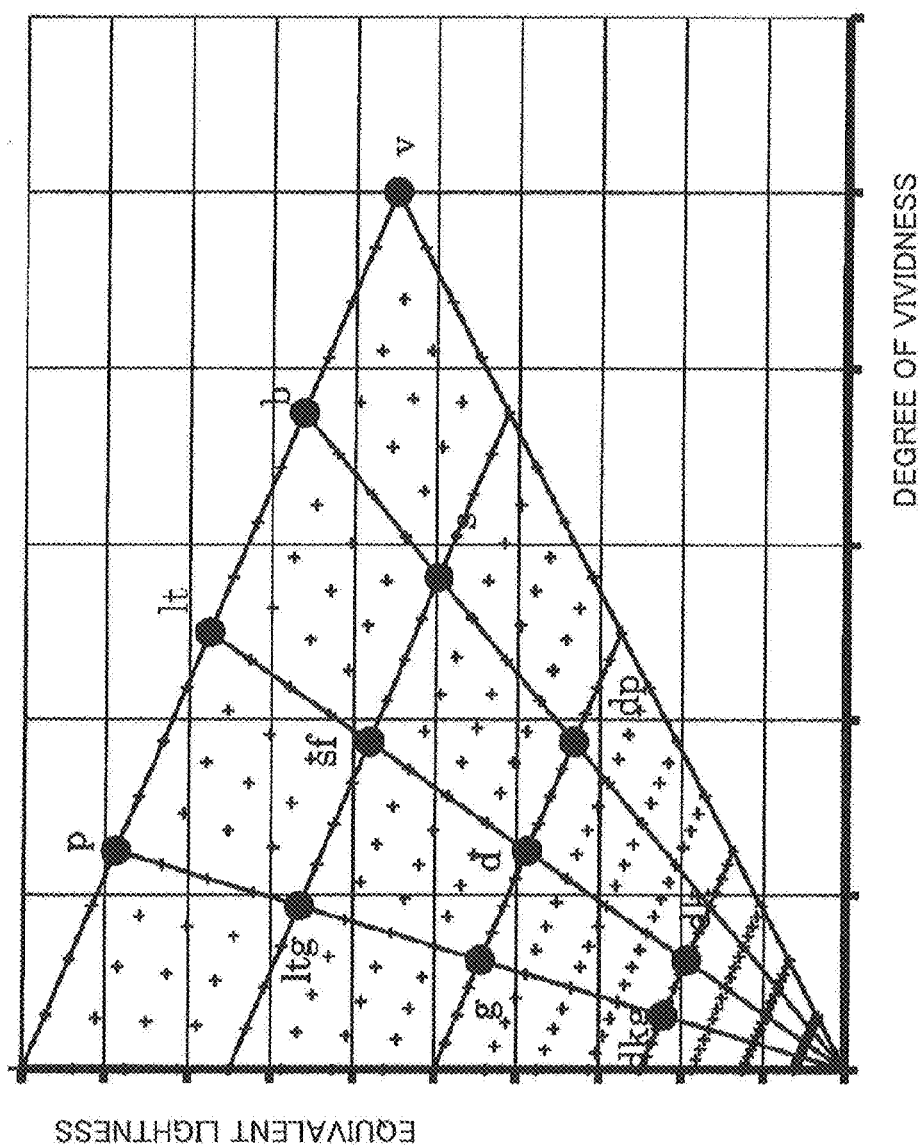
FIG. 35 is a diagram for explaining that the colors of tones other than representative values are mutually convertible with Munsell values and the like of the colors.
Figure 36:
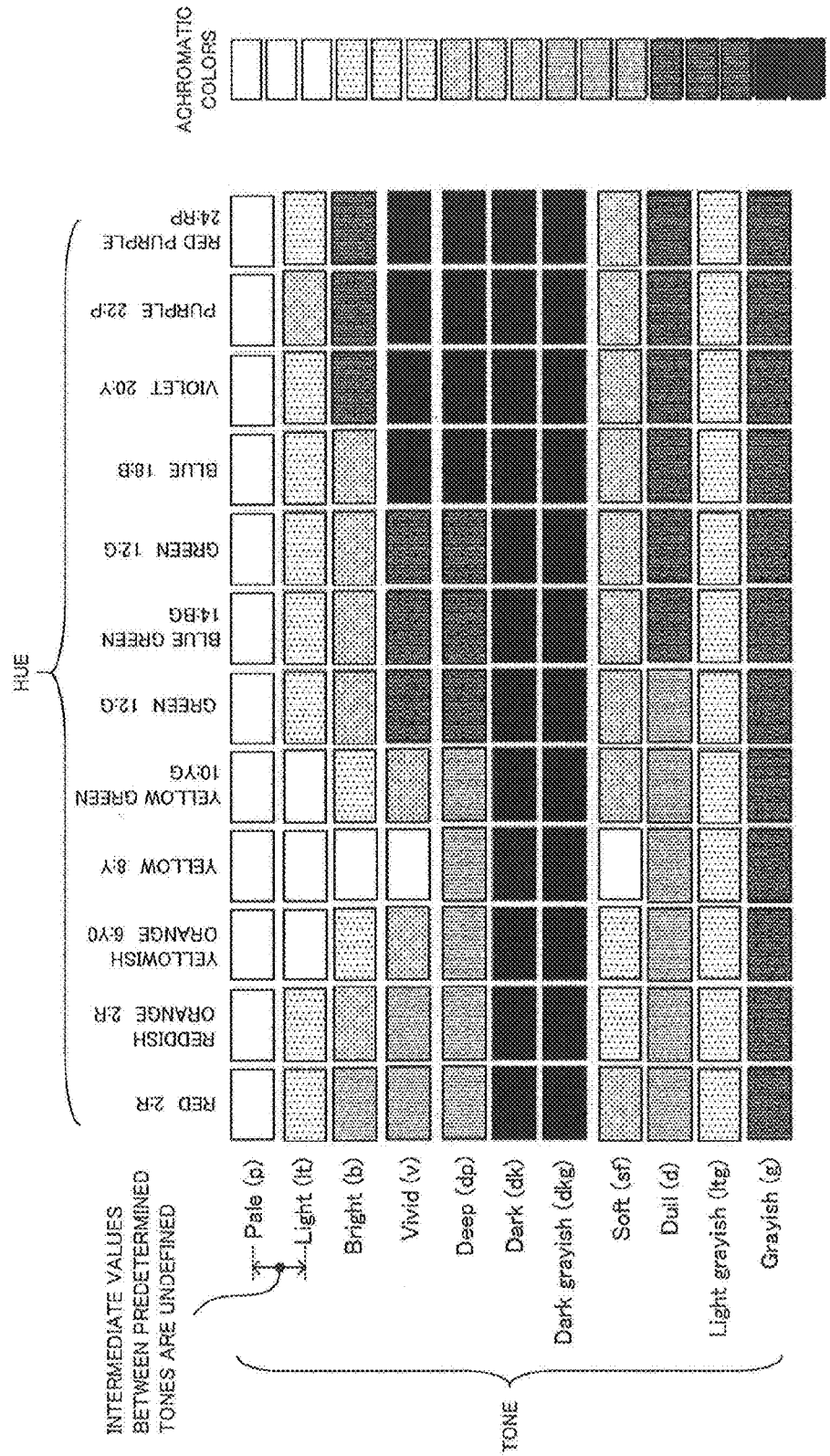
FIG. 36 is a conceptual diagram for explaining the outline of PCCS.

FIG. 34 is a graph showing, as an example, a state where the colors of the color chips of the respective 12 tones (p: pale, ltg: lightgrey, g: gray, dkg: darkgray, lt: light, sf: soft, d: dull, dk: dark, b: bright, s: strong, dp: deep, and v: vivid) in hue 2 of the HCC 201 are projected on the CIECAMO2 color space by the CPU 801. The CIECAM02 space is a color perception space including a hue H, a lightness J, a chroma C, and the like as coordinate axes.

The plots of the representative values of the HCC 201 on the coordinate plane of the lightness J and the chroma C of the CIECAMO2 color space show that three tone groups (p, ltg, g, and dkg), (lt, sf, d, and dk), and (b, s, and dp) are each arranged in a linear manner.

It can thus be seen that the lightness J and chroma C coordinates can be modified and optimized to express the tones in a similar manner to when the NT system is used.

Moreover, using the equivalent lightness and the degree of vividness as tone indexes, the colors of tones other than the representative values shown on the HCC 201 and the like (for example, intermediate values between v and b) can be mutually converted with Munsell values and the like of the colors (see FIG. 34).

Such indexes (the equivalent lightness and the degree of vividness) can be expressed in relative values with respect to vivid or the like in each hue to provide indexes common to all hues. Consequently, when an arbitrarily defined tone is designated, Munsell values and the like of colors having the same tone can be determined in all hues.

The various types of processing of the foregoing tone management system have been descried to be mainly executed by, but not necessarily limited to, the CPU 801 included in the personal computer 1. More specifically, the entire system has only to be able to eventually perform the intended calculations. For example, part of the arithmetic processing of the arithmetic algorithm to be performed by the entire system may be executed by the CPU 801, and the rest of the arithmetic processing may be executed by the CPU 902 of the server 2 (distributed processing).

It will be understood that the foregoing various types of arithmetic processing may be performed in combination as appropriate according to need.

Moreover, a program for causing the computer constituting the tone management system to perform the foregoing operations may be provided. The present embodiment has dealt with the case where the programs for implementing the functions for carrying out the invention are recorded in advance in a storage area arranged inside the apparatus. However, this is not restrictive, and similar programs may be downloaded from a network to the apparatus. Similar programs stored in a computer-readable recording medium may be installed on the apparatus. A recording medium of any form may be used as long as the recording medium can store the programs and can be read by the computer. Specific examples of the recording medium may include internal storage devices mounted inside the computer such as a ROM and a RAM, portable storage media such as a CD-ROM, a flexible disk, a DVD disk, a magneto-optical disk, and an IC card, databases storing computer programs, other computers and their databases, and online transmission media. Such functions obtained in advance by installation or downloading may cooperate with an OS (operation system) and the like inside the apparatus to implement the functions.

Part or all of the programs may be a dynamically generated execution module.

It will be understood that at least part of the various types of processing implemented by making the CPUs or MPUs execute the programs in the foregoing embodiment can be performed in a circuit form by using the ASIC 802.

The present invention may be carried out in various other forms without departing from the spirit or essential characteristics thereof. The foregoing embodiment is therefore to be considered in all aspects as merely illustrative and not restrictive. The scope of the present invention is indicated by the claims and not restricted by the foregoing description. All changes, various improvements, substitutions, and alterations which come within the meaning and range of equivalency of the claims are intended to be embraced in the scope of the present invention.

REFERENCE SIGNS LIST

1 personal computer,
2 server,
3 printer,
801 CPU,
802 ASIC,
803 MEMORY,
804 HDD,
805 display,
806 operation input device,
807 scanner,
808 color measurement device,
901 CPU,
902 ASIC,
903 MEMORY,
904 HDD,
101 Munsell value acquisition unit,
102 storage control unit,
103 color conversion unit,
104 regression arithmetic unit,
105 normalization arithmetic unit,
106 coordinate identification unit,
107 tone identification unit,
108 tone target value acquisition unit,
109 Munsell value acquisition unit
110 input screen display control unit,
111 calculation result display control unit
112 image forming unit.

The invention claimed is:
1. An interface screen display device comprising:
an input screen display control unit that causes an input screen for requesting a normalized degree of vividness DV* and equivalent lightness Veq* expressing a tone of target color, a Munsell hue MH of the target color, and a Munsell lightness MV_vivid and a Munsell chroma MC_vivid of Vivid color of a color material actually used to express a hue MH of the target color as input values on a color perception space including two axes of the Veq* and the DV* to be displayed, the color perception space being constructed by converting Munsell lightness V of a color into an equivalent lightness Veq indicating the lightness of color humanly perceived by using Munsell hue H and Munsell chroma C of the color, converting the Munsell chroma C of the color into a degree of vividness DV indicating the vividness of color humanly perceived by using the Munsell hue H and the Munsell lightness V, and normalizing the equivalent lightness Veq and the degree of vividness DV by using a equivalent lightness MV_vivid and a degree of vividness MC_vivid of a vivid color in the Munsell hue H of the color; and a calculation result display control unit that causes the Munsell lightness MV and the Munsell chroma MC calculated corresponding to a tone of the target tone specified by the input values input by the input screen display control unit to be displayed.

2. A normalization method for a value of an equivalent lightness and a value of a degree of vividness of an arbitrary color comprising:

allowing a computer to obtain Munsell hue, Munsell lightness and Munsell chroma of the arbitrarily color;

allowing the computer to convert the Munsell lightness into a value of an equivalent lightness indicating the lightness of color humanly perceived by using the Munsell hue and the Munsell chroma, and convert the Munsell chroma into a value of a degree of vividness indicating the vividness of color humanly perceived by using the Munsell hue and the Munsell lightness;

allowing the computer to normalize the value of the degree of vividness of the arbitrary color by using a value of a degree of vividness of a vivid color of the Munsell hue;

allowing the computer to normalize the value of the equivalent lightness of the arbitrary color by using a value of the equivalent lightness of the vivid color and a value of the equivalent lightness of white if the value of the equivalent lightness of the arbitrary color is equal to or greater than the value of the equivalent lightness of the vivid color; and allowing the computer to normalize the value of the equivalent lightness of the arbitrary color by using a value of the equivalent lightness of the vivid color and a value of the equivalent lightness of black if the value of the equivalent lightness of the arbitrary color is less than the value of the equivalent lightness of the vivid color.

3. The normalization method according to claim 2, further comprising:

allowing the computer to calculate an angular position and a distance corresponding to a tone of the arbitrary color in a color perception space coordinate defined by two axes of the normalized value of the equivalent lightness and the value of the degree of vividness in the Munsell hue, the angular position being an angle of a coordinate point corresponding to the arbitrary color with respect to an origin point of the color perception space coordinate, the distance being a distance from the origin point to the coordinate point corresponding to the arbitrary color.

4. The normalization method according to claim 2, further comprising:

allowing the computer to convert Munsell values H, V and C of the arbitrary color into the value of the equivalent lightness Veq and the value of the degree of lightness DV' on the basis of the following equations (1) to (5);

allowing the computer to normalize the value of the equivalent lightness Veq and the value of the degree of lightness DV' to calculate the value of the equivalent lightness Veq* and the value of the degree of lightness DV* on the basis of the following equations (6) to (8):

$$DV'=C(1+k2[W-Bk]) \quad (1)$$

$$Veq=[W-Bk]+0.1340\,q(H)\,C+Vg+0.0872\,C \quad (2)$$

$$[W-Bk]=V-Vg-q(H)\,C \quad (3)$$

$$k2=0.15 \quad (4)$$

$$Vg=5.5 \quad (5)$$

$$DV^*=DV'/DV'\_vivid\times 10 \quad (6)$$

$$Veq^*=((5.5-Veq\_W)/(Veq\_vivid-Veq\_W))\times(Veq-Veq\_W)+Veq\_W\ Veq\geq Veq\_vivid \quad (7)$$

$$Veq^*=((5.5-Veq\_Bk)/(Veq\_vivid-Veq\_Bk))\times(Veq-Veq\_Bk)+Veq\_Bk\ Veq<Veq\_vivid \quad (8)$$

where H is a value of the Munsell hue of the arbitrary color, V is a value of the Munsell lightness of the arbitrary color, C is a value of the Munsell chroma of the arbitrary color, Veq is the value of the equivalent lightness of the arbitrary color, DV' is the value of the degree of vividness of the arbitrary color, Veq_vivid is the value of the equivalent lightness of the vivid color, DV'_vivid is the value of the degree of vividness of the vivid color, Veq_W is the value of the equivalent lightness of the white, Veq_Bk is the value of the equivalent lightness of the black, Veq_W is 9.5, Veq_Bk is 1.5, and a value of a hue dependence coefficient $q(H)$ is determined on the basis of the following Table 1,

TABLE 1

| q(H) OF VARIOUS HUES | |
|---|---|
| MUNSELL HUE | q (H) |
| 5Y | 0.218 |
| 10YR | 0.135 |
| 5YR | 0.037 |
| 10R | −0.035 |
| 5R | −0.086 |
| 5RP | −0.14 |
| 5P | −0.157 |
| 5PB | −0.126 |
| 5B | −0.084 |
| 10BG | −0.042 |
| 5BG | −0.018 |
| 10G | −0.008 |
| 5G | 0.002 |
| 10GY | 0.061 |
| 5GY | 0.145 |
| 10Y | 0.2. |

5. The normalization method according to claim 4, comprising allowing the computer to extract hue dependence coefficients $q(H)$ corresponding to Munsell hues on both sides of the arbitrary Munsell hue of the arbitrary color on a color wheel in the Munsell color system on the basis of tables A-I and A-II; and

TABLE A-I

Chromatic strength values CS(k₁k₂) of various hues.

| Hue | k₁k₂ | CS(k₁k₂) | C(H; Max) | Munsell hue |
|---|---|---|---|---|
| Y100 | 0.542 | 1.000 | 20 | 5Y |
| Y75·R25 | 0.582 | 1.074 | 21 | 10YR |
| Y50·R50 | 0.651 | 1.201 | 24 | 5YR |
| Y25·R75 | 0.742 | 1.369 | 27 | 10R |
| R100 | 0.824 | 1.520 | 30 | 5R |
| R75·B25 | 0.925 | 1.707 | 34 | 5RP |
| R50·B50 | 0.976 | 1.800 | 36 | 5P |
| R25·B75 | 0.979 | 1.806 | 36 | 5PB |
| B100 | 0.876 | 1.616 | 32 | 5B |
| B75·G25 | 0.801 | 1.478 | 30 | 10BG |
| B50·G50 | 0.750 | 1.384 | 28 | 5BG |
| B25·G75 | 0.718 | 1.325 | 27 | 10G |
| G100 | 0.695 | 1.282 | 26 | 5G |
| G75·Y25 | 0.633 | 1.168 | 23 | 10GY |
| G50·Y50 | 0.556 | 1.026 | 21 | 5GY |
| G25·Y75 | 0.533 | 0.983 | 20 | 10Y |

TABLE A-II

Chromatic strength values CS(q) of various hues.

| Hue | q(H) | V(H)·w = bk = 0·/C = 10 | CS(q) |
|---|---|---|---|
| Y100 | 0.218 | 7.82 | 1.00 |
| Y75·R25 | 0.135 | 6.99 | 1.12 |
| Y50·R50 | 0.037 | 6.01 | 1.30 |
| Y25·R75 | −0.035 | 5.29 | 1.48 |
| R100 | −0.086 | 4.78 | 1.64 |
| R75·B25 | −0.140 | 4.24 | 1.84 |
| R50·B50 | −0.157 | 4.07 | 1.92 |
| R25·B75 | −0.126 | 4.38 | 1.79 |
| B100 | −0.084 | 4.80 | 1.63 |
| B75·G25 | −0.042 | 5.22 | 1.50 |
| B50·G50 | −0.018 | 5.46 | 1.43 |
| B25·G75 | −0.008 | 5.56 | 1.41 |
| G100 | 0.002 | 5.66 | 1.38 |
| G75·Y25 | 0.061 | 6.25 | 1.25 |
| G50·Y50 | 0.145 | 7.19 | 1.09 |
| G25·Y75 | 0.200 | 7.64 | 1.02 | allowing the computer to determine a hue dependence coefficient $q(H)$ corresponding to the arbitrary Munsell hue by proportionally distributing values of the hue dependence coefficients $q(H)$ according to values of the Munsell hues by using the following equation:

$$q(H)\_target = ((q(H)\_h - q(H)\_l) \times (H\_target - H\_l))/(H\_h - H\_l) + q(H)\_l,$$

where H_target is the Munsell hue of the arbitrary color, H_h is the Munsell hue on one side among the Munsell hues on both sides of the Munsell hue of the arbitrary color on the color wheel, H_l is the Munsell hue on the other side among the Munsell hues on both sides of the Munsell hue of the arbitrary color on the color wheel, $q(H)$_target is $q(H)$ corresponding to the Munsell hue of the arbitrary color, $q(H)$_h is $q(H)$ corresponding to the Munsell hue on the one side, and $q(H)$_l is $q(H)$ corresponding to the Munsell hue on the other side.

6. The normalization method according to claim 2, further comprising:

allowing the computer to obtain Munsell lightness and Munsell chroma of the vivid color; and allowing the computer to convert the Munsell lightness and the Munsell chroma of the vivid color into the value of the equivalent lightness and the value of the degree of vividness of the vivid color.

7. The normalization method according to claim 2, further comprising:

allowing the computer to obtain the Munsell hue, the Munsell lightness and the Munsell chroma of the arbitrarily color, and the Munsell lightness and the Munsell chroma of the vivid color from an operation input device that is operated by a user.

8. A tone type determination method comprising:

allowing a computer to obtain Munsell hue, Munsell lightness and Munsell chroma of an arbitrarily color;

allowing the computer to convert the Munsell lightness into a value of an equivalent lightness indicating the lightness of color humanly perceived by using the Munsell hue and the Munsell chroma, and convert the Munsell chroma into a value of a degree of vividness indicating the vividness of color humanly perceived by using the Munsell hue and the Munsell lightness;

allowing the computer to normalize the value of the degree of vividness of the arbitrary color by using a value of a degree of vividness of a vivid color of the Munsell hue;

allowing the computer to normalize the value of the equivalent lightness of the arbitrary color by using a value of the equivalent lightness of the vivid color and a value of the equivalent lightness of white if the value of the equivalent lightness of the arbitrary color is equal to or greater than the value of the equivalent lightness of the vivid color;

allowing the computer to normalize the value of the equivalent lightness of the arbitrary color by using a value of the equivalent lightness of the vivid color and a value of the equivalent lightness of black if the value of the equivalent lightness of the arbitrary color is less than the value of the equivalent lightness of the vivid color; and allowing the computer to determine one of tone groups to which the arbitrary color belongs in a color system having colors of a plurality of types of tones associated with a plurality of hues on the basis of normalized values indicating the equivalent lightness and values indicating a degree of vividness of the colors of a plurality of types of tones in the color system, and the normalized value of the equivalent lightness and the value of the degree of vividness of the arbitrary color.

9. A Munsell value calculating method comprising:

allowing a computer to obtain a normalized value of equivalent lightness and a value of a degree of vividness corresponding to a tone of a target color and Munsell hue of the target color in a color perception space, the color perception space being constructed by converting Munsell lightness of a color into a value of an equivalent lightness indicating the lightness of color humanly perceived by using Munsell hue and Munsell chroma, converting the Munsell chroma of the color into a value of a degree of vividness indicating the vividness of color humanly perceived by using the Munsell hue and the Munsell lightness, and normalizing the value of the equivalent lightness and the value of the degree of vividness by using a value of equivalent lightness and a value of a degree of vividness of a vivid color in the Munsell hue; and allowing the computer to calculate Munsell lightness and Munsell chroma of the target color on the basis of the normalized value of equivalent lightness and the value of the degree of vividness corresponding to the tone of the target color and the normalized value of equivalent lightness and the value of the degree of vividness of the vivid color in the Munsell hue of the target color.

10. A Munsell value calculating method according to claim 9, further comprising:
- allowing the computer to obtain Munsell lightnesses and Munsell chromas of Vivid colors in a respective plurality of types of the color materials that are used for expressing the hue of the target color; and
- allowing the computer to calculate the Munsell lightness and the Munsell chroma of the target color on the basis of the lowest values of the obtained Munsell lightnesses and the Munsell chromas.

11. An image formation method comprising:
- forming an image of the color designated by the Munsell value of the target color calculated in the Munsell value calculating method according to claim 9.

12. The Munsell value calculating method according to claim 9, further comprising:
- allowing the computer to obtain Munsell lightness and Munsell chroma of the vivid color in the Munsell hue of the target color; and
- allowing the computer to convert the Munsell lightness and the Munsell chroma of the vivid color into the value of the equivalent lightness and the value of the degree of vividness of the vivid color.

13. The Munsell value calculating method according to claim 10, further comprising:
- allowing the computer to obtain the Munsell hue, the Munsell lightness and the Munsell chroma of the target color, and the Munsell lightness and the Munsell chroma of the vivid color from an operation input device that is operated by a user.

14. A Munsell value calculating method comprising:
- allowing a computer to obtain Munsell hue of a target color and an angular position and a distance corresponding to a tone of the target color in a color perception space coordinate defined by two axes of a normalized value of an equivalent lightness and a value of a degree of vividness in the Munsell hue, the angular position being an angle of a coordinate point corresponding to the arbitrary color with respect to an origin point of the color perception space coordinate, the distance being a distance from the origin point to the coordinate point corresponding to the arbitrary color, the color perception space coordinate being constructed by converting Munsell lightness of a color into a value of an equivalent lightness indicating the lightness of color humanly perceived by using Munsell hue and Munsell chroma, converting the Munsell chroma of the color into a value of a degree of vividness indicating the vividness of color humanly perceived by using the Munsell hue and the Munsell lightness, and normalizing the value of the equivalent lightness and the value of the degree of vividness by using a value of equivalent lightness and a value of a degree of vividness of a vivid color of the Munsell hue;
- allowing the computer to calculate a normalized value of equivalent lightness and a value of the degree of vividness of the target color based on the angular position and the distance; and
- allowing the computer to calculate Munsell lightness and Munsell chroma of the target color on the basis of the normalized value of equivalent lightness and the value of the degree of vividness of the target color and the value of equivalent lightness and the value of the degree of vividness of the vivid color in the Munsell hue of the target color.

* * * * *